(12) United States Patent  
Douglas

(10) Patent No.: US 7,944,997 B2
(45) Date of Patent: May 17, 2011

(54) GPS M-CODE RECEIVER TRACKING SYSTEM

(75) Inventor: Randal K. Douglas, Redondo Beach, CA (US)

(73) Assignee: The Aerospace Corporation, El Segundo, CA (US)

( * ) Notice: Subject to any disclaimer, the term of this patent is extended or adjusted under 35 U.S.C. 154(b) by 0 days.

(21) Appl. No.: 12/610,813

(22) Filed: Nov. 2, 2009

(65) Prior Publication Data

US 2010/0046589 A1    Feb. 25, 2010

Related U.S. Application Data

(62) Division of application No. 11/500,801, filed on Aug. 8, 2006.

(51) Int. Cl.
*H04B 1/00* (2006.01)
*H04L 27/00* (2006.01)

(52) U.S. Cl. ........ 375/316; 375/136; 375/137; 375/324; 375/325; 375/340; 375/342; 375/343; 375/150

(58) Field of Classification Search .......... 375/136–137, 375/147–152, 316, 324–326, 343; 342/357.03, 342/378–384
See application file for complete search history.

(56) References Cited

U.S. PATENT DOCUMENTS

| | | | |
|---|---|---|---|
| 6,704,348 B2 | 3/2004 | Abraham et al. | |
| 6,819,707 B2 | 11/2004 | Abraham et al. | |
| 6,891,880 B2 | 5/2005 | Abraham | |
| 6,914,931 B2 * | 7/2005 | Douglas et al. | 375/147 |
| 6,922,167 B2 * | 7/2005 | Gerein | 342/357.74 |
| 7,092,429 B1 | 8/2006 | McKenney | |
| 7,190,746 B1 * | 3/2007 | Stockmaster et al. | 375/343 |
| 7,375,680 B2 | 5/2008 | Watson et al. | |
| 7,471,241 B1 * | 12/2008 | Yang | 342/357.12 |
| 7,555,033 B2 | 6/2009 | Lito et al. | |
| 2003/0231580 A1 * | 12/2003 | Martin et al. | 370/203 |
| 2004/0071196 A1 * | 4/2004 | Marsden et al. | 375/147 |
| 2005/0270997 A1 * | 12/2005 | Julien et al. | 370/315 |
| 2006/0005087 A1 | 1/2006 | Ristau et al. | |
| 2007/0211791 A1 * | 9/2007 | Ganguly et al. | 375/148 |

* cited by examiner

*Primary Examiner* — Chieh M Fan
*Assistant Examiner* — Sophia Vlahos
(74) *Attorney, Agent, or Firm* — K&L Gates LLP

(57) ABSTRACT

An m-code GPS receiver receives m-code GPS communication signals having a multimodal autocorrelation, using an m-code mode identifier unambiguously determining a mode value of one of the m-code modal peaks coherently aligned to a coherent unimodal detected envelope, based on sequential probability estimation in an m-code envelope tracking filter using filter residual estimation or with a coherent m-code and c/a-code tracking filter also based on filter residual estimation, for generating m-code phase errors, for unambiguous and precise m-code code phase tracking in closed feedback loops, for preferred use in navigation systems.

6 Claims, 10 Drawing Sheets

ULTRATIGHT COHERENT M-CODE AND CA-CODE NAVIGATION PROCESSOR

GPS INERTIAL NAVIGATION SYSTEM

WEAK LOCK M-CODE ENVELOPE NAVIGATION PROCESSOR

ULTRATIGHT M-CODE ENVELOPE NAVIGATION PROCESSOR

ADAPTIVE M-CODE ENVELOPE TRACKING SYSTEM

M-CODE ENVELOPE DETECTOR

M-CODE ENVELOPE TRACKING FILTER

M-CODE MODE IDENTIFIER

ULTRATIGHT COHERENT M-CODE AND CA-CODE NAVIGATION PROCESSOR

ADAPTIVE COHERENT M-CODE AND CA-CODE TRACKING SYSTEM

COHERENT M-CODE AND CA-CODE TRACKING FILTER

GPS M-CODE RECEIVER TRACKING SYSTEM

This application is a divisional of co-pending U.S. patent application Ser. No. 11/500,801 filed on Aug. 8, 2006, which is incorporated herein by reference in its entirety.

FIELD OF THE INVENTION

The invention relates to the field of communications and navigation systems. More particularly, the present invention relates to tracking GPS m-code signals for use in communications and navigation systems.

BACKGROUND OF THE INVENTION

The GPS m-code signal is a symmetric multimodal signal having a plurality of modes or peaks in a multimodal autocorrelation function of the m-code signal. The steep gradients of the m-code autocorrelation function about the peaks allow for precise code phase tracking with conventional square law code tracking loops and other code tracking schemes. The m-code autocorrelation function has seven modes, all indistinguishable with respect to conventional early, prompt, and late correlator tap arrangements. A problem with tracking of the m-code multimodal autocorrelation function is that code phase error estimates can be ambiguous at to which one of the peaks is being tracked.

A weak-lock GPS signal tracking system uses a GPS signal-tracking filter. The GPS signal-tracking filter is an extended Kalman filter with high data rate of 1000 Hz, measurements that include early, prompt, and late inphase and quadrature correlations. States of the GPS signal-tracking filter include a carrier replica phase error, a carrier replica Doppler error, and a code replica phase error. In the weak-lock configuration, the states of the GPS signal-tracking filter, which are directly related to code replica, carrier replica phase, and Doppler errors are applied to both replicas at a very low rate of 1.0 Hz as a correction. The steep gradients of the m-code autocorrelation function allow precise estimates of the code replica phase error but only with respect to a neighboring m-code autocorrelation peak. Tracking of a modal peak to achieve precise m-code replica phase error estimation introduces ambiguity with respect to which one of the autocorrelation peaks is currently being tracked.

An m-code envelope processor has a unimodal autocorrelation function with a single mode coincident with a center peak of the m-code autocorrelation function. An m-code envelope has only one correlation peak so tracking the m-code signal about the center peak is unambiguous. However, an m-code envelope does a low-grade gradient as compared to the steep gradient of the m-code autocorrelation function so tracking the m-code signal using only an m-code envelope is not precise, in a local sense, as with conventional early, prompt, and late m-code correlation taps.

M-code envelope processors fall into two classes. One class of m-code processor uses an m-code envelope signal tracking system to form an envelope using the m-code signal. An m-code processor can use conventional or specially configured harmonic m-code correlation taps. The m-code envelope processor with harmonic m-code correlators forms a smooth, monotonic, low-grade gradient envelope but the harmonic m-code correlators are not a conventional design adding complexity and cost to the m-code signal tracking system.

The second class of m-code processor is a coherent code envelope processor. The coherent code envelope processor uses a coherently tracked unimodal code, such as the c/a-code or p(y)-code, modulated on the same carrier. Coherently tracked means replicas for all codes, the m-code and other unimodal codes, are assigned such that the replica phase errors are the same. An ultra tightly coupled GPS tracking system provides coherent code tracking because replicas for all codes are computed using only a reference navigation solution and satellite ephemeredes. Coherently tracked codes do not have the steep gradient of the m-code autocorrelation function so tracking, in the local sense, is not as precise as with conventional early, prompt, and late m-code correlation taps. The m-code tracking processors suffer from either accurate but ambiguous tracking, or, unambiguous but inaccurate tracking. These and other problems are solved or reduced using the present invention.

SUMMARY OF THE INVENTION

An object of the invention is to provide a system for improved code phase tracking in m-code spread spectrum communication systems.

Another object of the invention is to provide a system for unambiguously tracking the GPS m-code signal using a low-grade gradient detected coherent envelope and for accurate tracking of the GPS m-code signal about a steep modal peak of the m-code autocorrelation function.

A further object of the invention is to provide a system for generating m-code phase tracking errors for m-code phase tracking of GPS m-code spread spectrum communication signals using an extended Kalman filter and a sequential probability ratio test for improved locking in a GPS navigation system.

The present invention can be implemented in a receiving communication system that code phase tracks a multimodal spread spectrum signal. An exemplar multimodal signal is the GPS m-code spread spectrum signal. The decorrelation of the multimodal chipping code is the m-code autocorrelation function having a plurality of peaks or modes. In a preferred form, an m-code envelope encompassing the peaks is first determined for determining which one of the modes is currently aligned to the current code phase for removing ambiguity as to which mode is being tracked and for updating the code phase to the center mode. The correlation function is then tracked about the steep gradient center peak of the correlation for maintaining accurate code phase lock. In the preferred form, the invention uses envelope detection with the m-code correlation taps of m-code correlators to achieve unambiguous m-code phase error detection using the unimodal peak of the envelope. The unambiguous m-code phase error detection is then combined with accurate tracking of the steep gradients of the multimodal m-code autocorrelation function for precise and unambiguous tracking of the m-code phase error. The envelope detection can be m-code envelope detection or coherent envelope detection, such as c/a-code envelope detection. In a first aspect of the invention, the m-code envelope can be generated directly from the peaks of the m-code correlation. Alternatively, as a second aspect of the invention, the envelope can be generated from or is an autocorrelation of a coherently received chipping code signal such as the preferred GPS c/a-code signal having an autocorrelation function that encompasses and envelops the multimodal peaks of the m-code autocorrelation. By first determining the code phase error of the coherently received spread spectrum signal, the code phase error is coherently aligned to the center mode of the multimodal signal. After alignment, the center mode code phase error is accurately tracked for maintaining the correct code phase of the multimodal signal. Both aspects of the invention are directed to m-code mode resolution. The first aspect of the invention includes m-code envelope detection using conventional m-code correlation taps. The second aspect uses a coherently tracked unimodal code, such as the GPS c/a-code or p-code. With either approach, an extended Kalman filter can be used to form a statistically independent sequence of residuals that is biased by the m-code mode. The system uses an extended Kalman filter and sequential probability ratio test m-code replica phase error estimation well suited for m-code spread spectrum communication systems such as GPS navigation systems. Statistical computations identify the correct mode and then to detect mode slips. A Wald sequential probability ratio test generates a conditional probability for each mode that the mode is the correct one. A Shiryayev sequential probability ratio test generates conditional probabilities that the mode has slipped from the nominal mode to another. The m-code modes are combined using the conditional probabilities as weights to form an m-code mode estimate. The m-code mode estimate is fed back to the extended Kalman filter that uses the m-code mode estimate to form an observation model. The computational burden is reduced because the system uses only one Kalman filter. These and other advantages will become more apparent from the following detailed description of the preferred embodiment.

DETAILED DESCRIPTION OF THE PREFERRED EMBODIMENT

Figure 1:
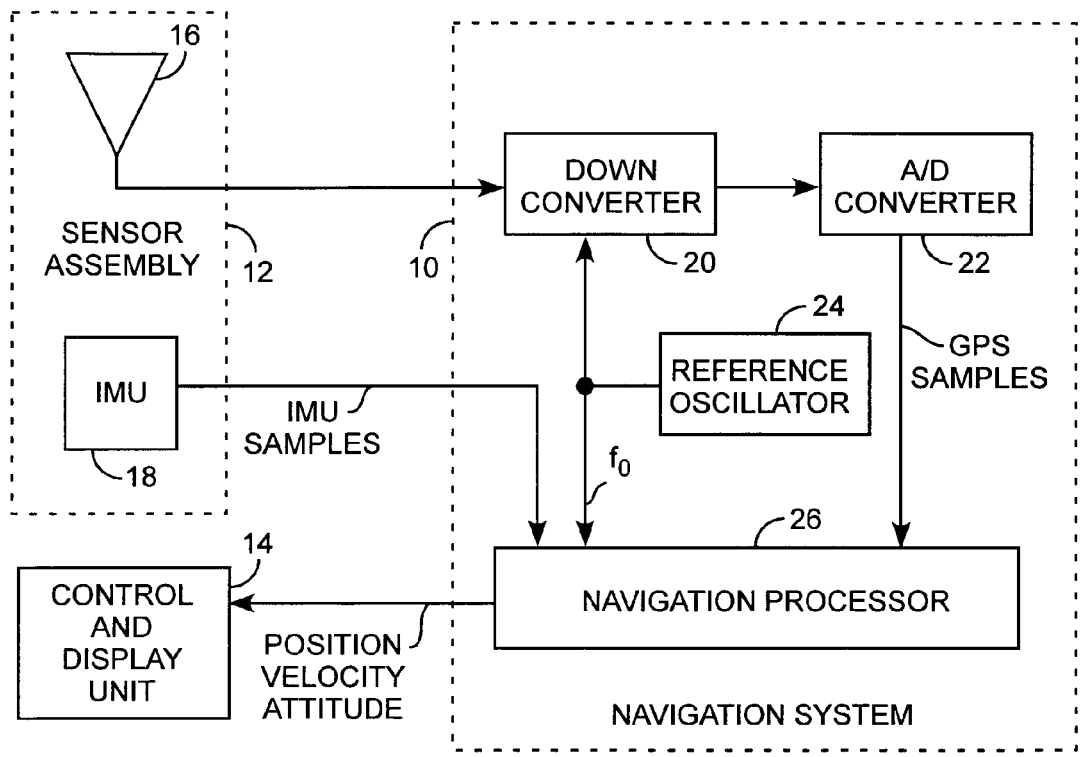
FIG. 1 is a block diagram of a GPS inertial navigation system.

An embodiment of the invention is described with reference to the figures using reference designations as shown in the figures. Referring to FIG. 1, a global positioning system (GPS) inertial navigation system includes a navigation system 10 receiving GPS signals and inertial measurement unit samples from a sensor assembly 12 and provides position and velocity data to a control and display unit 14. The navigation system 10 functions as a GPS inertial navigation system tracking GPS signals from a plurality of in-view satellites, not shown. The sensor assembly 12 includes an antenna 16 for receiving and providing received GPS signals and includes an inertial measurement unit (IMU) 18 providing the IMU sample signals, both of which are communicated to the navigation system 10. The navigation system 10 includes a downconverter 20 for frequency downconversion of the received GPS signals using a reference oscillator 24 providing an $f_o$ internal frequency reference, and includes an analog to digital (A/D) converter 22 communicating digitized GPS samples to a navigation processor 26. The navigation processor 26 also receives the IMU samples and provides the position and velocity data to the control and display unit 14. The navigation system can be hosted on a vehicle for receiving a GPS signal from a satellite through the vehicular antenna 16.

Figure 2:
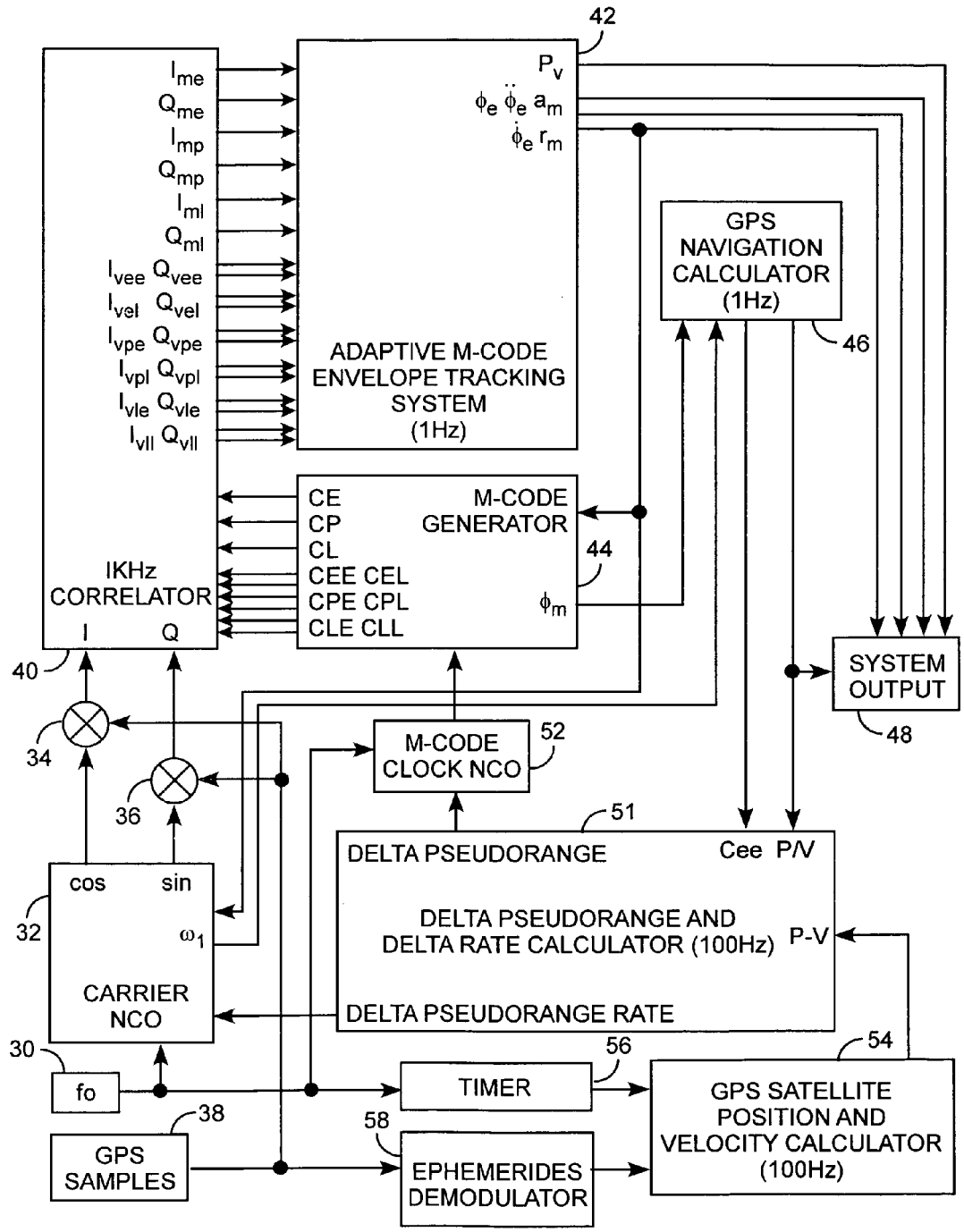
FIG. 2 is a block diagram of a weak-lock m-code envelope navigation processor.

Referring to FIGS. 1 and 2, and more particularly to FIG. 2, the navigation system 10 may be a weak-lock m-code envelope navigation processor that includes a navigation processor 26 receiving the digitized GPS samples 38. The samples 38 are communicated to mixers 34 and 36 for providing inphase (I) and quadrature (Q) signals respectively using cosine and sine demodulation signals from a carrier numerically controlled oscillator (NCO) 32. The NCO 32 is driven by a reference oscillator 30 feeding an $f_o$ reference signal to the mixers 34 and 36 for demodulation of the samples. The $f_o$ reference signal is also fed to a timer 56 for driving a GPS satellite position and velocity calculator 54. The cosine and sine demodulation signals are replica carrier signals for carrier demodulating the received GPS samples 38 that are also fed to an ephemeredes demodulator 58 for providing ephemerid data to the GPS satellite position and velocity calculator 54. The calculator 54 provides position and velocity data P-V of a transmitting satellite to a delta pseudorange and delta rate calculator 51 for providing delta pseudo range data to an m-code clock NCO 52 for sampling I and Q sample signals 38. The I and Q samples 38 are received by a correlator 40. The correlator 40 also receives early (CE), prompt (CP), late (CL), early-early (CEE), early-late (CEL), prompt-early (CPE), prompt-late (CPL), late-early (CLE), and late-late (CLL) code replica signals from an m-code chipping code generator 44 receiving a chipping code clocking signal from an m-code clock NCO 52. The chipping m-code may be a direct sequence spread spectrum code. The correlator 40 may operate, for example, at 1 KHz. The correlator 40 provides inphase and quadrature sample signals. The inphase and quadrature sample signals preferably include early $I_{me}$, $Q_{me}$, prompt $I_{mp}$, $Q_{mp}$, late $I_{ml}$, $Q_{ml}$, envelope early-early $I_{vee}$, $Q_{vee}$, envelope early late $I_{vel}$, $Q_{vel}$, envelope prompt-early $I_{vpe}$, $Q_{vpe}$, envelope prompt-late $I_{vpl}$, $Q_{vpl}$, envelope late-early $I_{vle}$, $Q_{vle}$, and envelope late-late $I_{vll}$, $Q_{vll}$. The correlated sample signals are communicated at a fixed rate, for example, at 1K Hertz into an adaptive m-code envelope tracking system 42. The adaptive m-code envelope tracking system 42 has, for example, a one Hertz system output 48. The system output 48 preferably includes a carrier phase error signal $\phi_e$, a carrier phase error rate signal $\dot{\phi}_e$, a carrier frequency error rate signal $\ddot{\phi}_e$, an m-code global range error signal $r_m$, an amplitude state $a_m$ signal, and an envelope state covariance matrix $P_v$. The m-code global range error $r_m$ is the desired unambiguous and accurate m-code code phase error. The carrier phase error rate $\dot{\phi}_e$, and the m-code global range error signal $r_m$ are communicated to the carrier NCO 32 for adjusting the cosine and sine downconverting carrier signals to the mixers 34 and 36 for coherent demodulation of the GPS samples 38.

The adaptive m-code envelope tracking system 42 receives I and Q sampled outputs from the 1 KHz correlator 40. The adaptive m-code envelope tracking system 42 drives the NCOs 32 and 52, and the code generator 44, while providing an integrated error vector including signals $\phi_e$, $\dot{\phi}_e$, $\ddot{\phi}_e$, $r_m$, and $a_m$, and the envelope state covariance $P_v$ as part of a system output 48. The $\phi_e$, $\dot{\phi}_e$, and $\ddot{\phi}_e$ signals may, in the context of inertial navigation, respectively correspond to pseudorange, pseudorange rate, and pseudorange acceleration. The carrier frequency error $\dot{\phi}_e$ is the first time rate of change derivative of the carrier phase error $\phi_e$. The carrier frequency rate error $\ddot{\phi}_e$ is the second time rate of change derivative of the carrier phase error $\phi_e$. The adaptive m-code envelope tracking system 42 also computes the signal amplitude state $a_m$, m-code global range error $r_m$, and the envelope state covariance $P_v$ as part of a measurement vector. The adaptive m-code envelope tracking system 42 computes the envelope state covariance $P_v$ indicating the uncertainties in the measurement vector of errors for a number of samples m over a major cycle epoch time. The adaptive m-code envelope tracking system 42 can be used as a part of a weak-lock navigation processor using local carrier and code tracking loops for improved code and carrier tracking. The adaptive m-code envelope tracking system 42 can further be used in an ultratight method for GPS pseudorange computation tightly coupled with the correlation process to improve the ability to maintain tracking lock upon the received GPS signals.

In the exemplar weak-lock m-code envelope navigation processor, the adaptive m-code envelope tracking system 42 and GPS navigation calculator 46 provide the system outputs 48. The system outputs 48 include the receiver position and velocity output P/V. The m-code global range error $r_m$ is communicated to the m-code generator 44 in a local code phase tracking loop. Concurrently, the carrier frequency error $\dot{\phi}_e$ is fed to the carrier NCO 32 in a carrier-tracking loop. An m-code prompt code phase $\phi_m$ from the m-code generator 44 and a carrier Doppler frequency $\omega_1$ from the carrier NCO 32 are communicated to the GPS navigation calculator 46. The carrier Doppler frequency $\omega_1$ may be for example, an L1 band Doppler frequency offset signal. The GPS navigation calculator 46 computes the best estimate of the navigation state vector solution defined by the vehicular position and velocity data P/v. The vehicular position and velocity data P/V is communicated to a delta pseudorange and delta rate calculator 51. The GPS navigation calculator 46 also computes user clock error estimates Cee communicated to the delta pseudorange and delta rate calculator 51. The delta pseudorange and delta rate calculator 51 receives the position and velocity data P-V of the satellite and the position and velocity data P/V of a vehicle hosting the navigation processor. The delta pseudorange and delta rate calculator 51 provides the delta pseudorange rate to the carrier NCO 32 and the delta pseudorange to the m-code NCO 52. The m-code NCO 52 also receives the $f_o$ reference clock for generating an m-code clock signal that is fed to the m-code generator 44. That is, in the weak-lock m-code envelope navigation processor, the GPS navigation calculator 46 provides the best estimate of the navigation state vector solution. The navigation state vector solution is indicated by the position and velocity data P/V communicated to the 100 Hz delta pseudorange and delta rate calculator 51 that, in turn, provides delta pseudorange rate data to the carrier NCO 32 and provides delta pseudorange data to the code NCO 52. The delta pseudorange and delta rate calculator 51 receives calculated GPS satellite position and velocity P-V data from a 100 Hz GPS satellite position and velocity calculator 54 and receives the clock error estimates Cee. The term P-V references the GPS satellite calculated position and velocity data. The clock error estimates Cee include a clock phase error and clock frequency error. The clock frequency error is the time derivative of the clock phase error. The calculated delta pseudorange is equal to the change in the geometric line-of-sight range to a satellite adjusted by the clock phase error estimates Cee and certain signal propagation compensation terms, such as the nominal ionospheric and tropospheric delays. The delta pseudorange is a change in a geometric range taken with respect to the one Hertz adaptive m-code envelope tracking system 42 updates applied to the carrier NCO 32 and the m-code generator 44. The geometric range is computed from the GPS calculated position and velocity data P-V and from the navigation calculated position and velocity data P/V. The delta pseudorange rate is equal to the change in the relative geometric velocity between the satellite and the vehicular antenna 16 plus the clock frequency error estimate. The GPS satellite position and velocity calculator 54 receives timing signals from a timer 56 using the clock reference $f_o$ 30 and receives demodulated ephemeris data from an ephemeris demodulator 58 using the GPS samples 38 to compute the GPS satellite position and velocity data P-V. The weak-lock formulation accommodates larger error between the replica signal and the received signal by observing the errors over many data samples and correcting the replica signal at a much lower rate than the sampling rate of the correlation process inputs.

Figure 3:
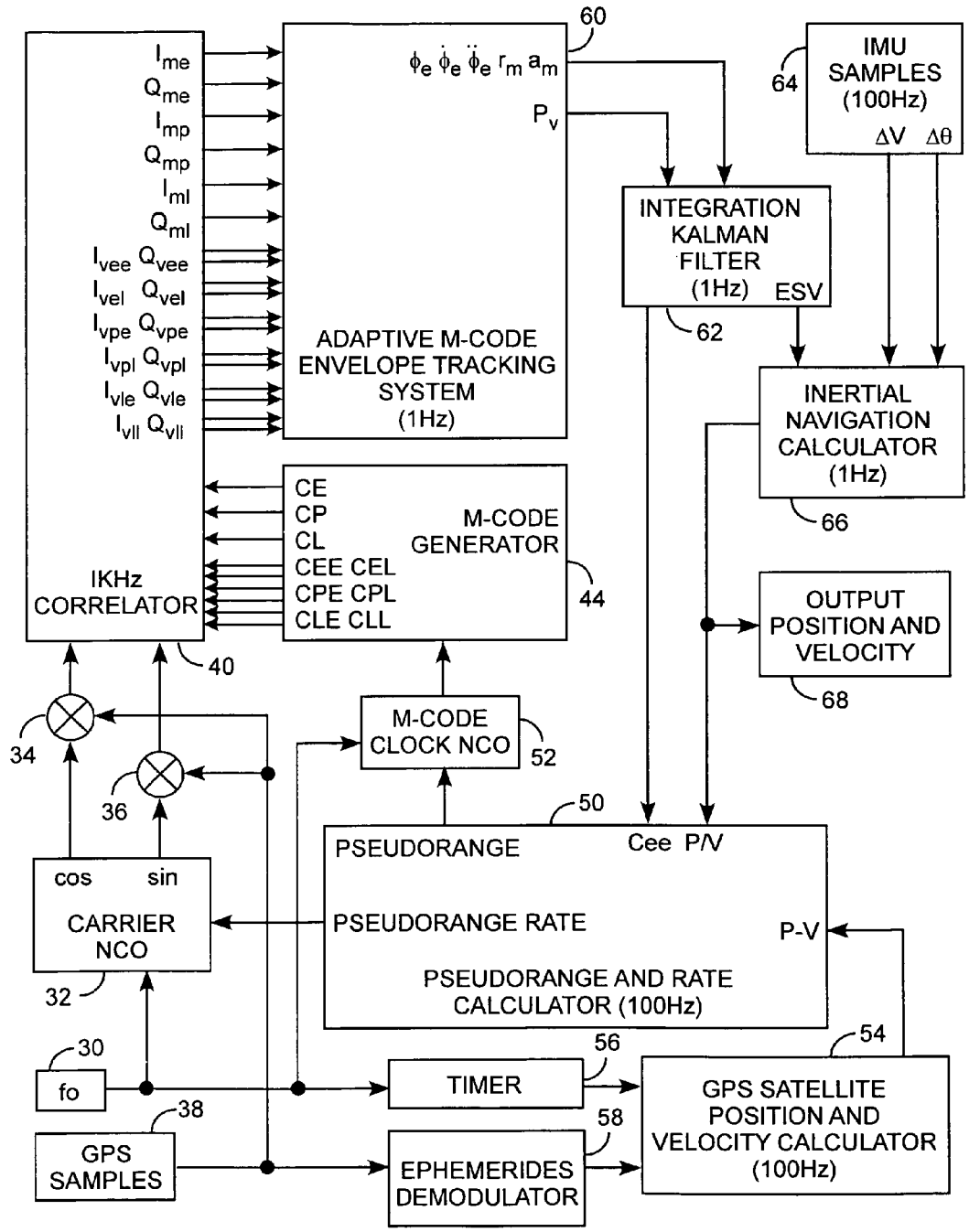
FIG. 3 is a block diagram of an ultratight m-code envelope tracking system.

Referring to FIGS. 1, 2, and 3, and more particularly FIG. 3, an exemplar ultratight m-code envelope navigation processor also receives the $f_o$ carrier frequency 30 and GPS samples 38. The ultratight m-code envelope navigation processor includes the NCOs 32 and 52, mixers 34 and 36, calculators 50 and 54, the timer 56, the ephemeredes demodulator 58, the m-code generator 44, and the correlator 40. The carrier NCO 32 is used for generating carrier replica signals for quadrature demodulation of the received GPS samples 38. The m-code generator 44 is again used for generating the early CE, prompt CP, late CL, early-early CEE, early-late CEL, prompt-early CPE, prompt-late CPL, late-early CLE, and late-late CLL code replica signals. The correlator 40 is again used for integrate and dump correlation of I and Q carrier demodulated signals correlated to the m-code replica signals. The correlation process is again based upon the replica m-code signal generation by the m-code generator 44 driving by a replica carrier generated by the carrier NCO 32.

As the pseudorange and pseudorange rate data from the calculator 50 is refreshed during each cycle, the replica carrier cosine and sine signals from the carrier NCO 32 are adjusted. Concurrently, the early, prompt, late, early-early, early-late, prompt-early, prompt-late, late-early, and late-late replica m-code signals from the m-code generator 44 are also adjusted under closed loop processing. The correlator 40 may operate at 1000 Hz. This 1000 Hz rate enables conventional correlation when receiving code replicas and samples. The code replicas include the CE, CP, CL, CEE, CEL, CPE, CPL, CLE, and CLL code replica signals. The samples include the demodulated correlated quadrature samples. The correlator 40 then generates the $I_{me}$, $Q_{me}$, $I_{mp}$, $Q_{mp}$, $I_{ml}$, $Q_{ml}$, $I_{vee}$, $Q_{vee}$, $I_{vel}$, $Q_{vel}$, $I_{vpe}$, $Q_{vpe}$, late $I_{vpl}$, $Q_{vpl}$, $I_{vle}$, $Q_{vle}$, $I_{vll}$, $Q_{vll}$ quadrature correlation samples. The quadrature correlation samples are fed to the adaptive m-code envelope tracking system 60. The quadrature correlation samples contain amplitude information that can be used to estimate the code and carrier errors $\phi_e$, $\dot{\phi}_e$, $\ddot{\phi}_e$, $r_m$, and $a_m$, and the envelope state covariance matrix $P_v$.

The ultratight navigation processor additionally receives IMU samples 64 that are communicated to a 100 Hz inertial navigation calculator 66 providing the receiver position and velocity outputs P/V 68. The adaptive m-code envelope tracking system 60 provides the measurement vector of errors including the signals $\phi_e$, $\dot{\phi}_e$, $\ddot{\phi}_e$, $r_m$, and $a_m$, and the envelope state covariance $P_v$ that are communicated to the one Hertz integration Kalman filter 62 having a one-second major cycle time period between Kalman filter epochs. The integration Kalman filter 62 in turn repetitively provides estimates of the position and velocity errors in the error state vector ESV that are used to compute the output position and velocity data P-V as position and velocity outputs 68 that are communicated to the control unit 14. The IMU samples 64 are communicated to the 100 Hz inertial navigation calculator 66. inertial navigation calculator 66 computes the best estimate of the navigation state vector solution defined by GPS receiver vehicular position and velocity data P/V. The vehicular position and velocity data P/V is calculated using the IMU samples 64 and the error state vector ESV. At the end of each of the one-second major cycles, the integration Kalman filter 62 updates the ESV and then communicates the updated ESV to the navigation calculator 66. The IMU samples 64 are repetitively generated, for example, one hundred times a second, and include differential velocity samples $\Delta v$ and differential attitude samples $\Delta \theta$ that are communicated to the 100 Hz inertial navigation calculator 66 also receiving the error state vector ESV every second from the integration Kalman filter 62. The integration Kalman filter 62 computes the user clock error estimates Cee that are communicated to the pseudorange and rate calculator 50. The 100 Hz inertial navigation calculator 66 is used for strapdown inertial navigation processing.

In the exemplar ultratight navigation processor, the navigation calculator 66 provides the best estimate of the navigation state vector solution. The navigation state vector solution indicates the position and velocity data P/V. The position and velocity data P/V is communicated to the 100 Hz pseudorange and pseudorange rate calculator 50. The pseudorange and pseudorange rate calculator 50 in turn provides the pseudorange rate data to the carrier NCO 32 and provides the pseudorange data to the m-code clock NCO 52. The pseudorange and pseudorange rate calculator 50 receives calculated GPS satellite position and velocity P-V data from the 100 Hz GPS satellite position and velocity calculator 54 and receives the user clock error estimates Cee. The clock error estimates Cee include a clock phase error and a clock frequency error that is the time derivative of the clock phase error. The calculated pseudorange is equal to the geometric line-of-sight range to a satellite adjusted by the clock phase error estimates Cee and signal propagation compensation terms, such as the nominal ionospheric and tropospheric delays. The geometric range is also computed from the GPS calculated satellite position and velocity data P-V and from the calculated vehicular position and velocity data P/V. The pseudorange rate is again equal to the relative geometric velocity to the satellite from the vehicular antenna 16 in addition to the clock frequency error estimate. The GPS satellite position and velocity calculator 54 receives timing signals from the timer 56 using the local clock reference $f_o$ 30 and receives demodulated ephemeris data from an ephemeris demodulator 58 using the GPS samples 38 to compute the GPS satellite position and velocity data P-V.

The GPS satellite position and velocity calculator 54 is again used for satellite GPS position and velocity calculation. The pseudorange and rate calculator 50 is used for line-of-sight pseudorange and pseudorange rate predictions for ultratight tracking whereas the delta pseudorange and delta rate calculator 51 is used for indicating changes in line-of-sight pseudorange and pseudorange rate predictions, which are aiding signals for weak-lock tracking. In the weak-lock navigation processor, the navigation processor is not coupled into the carrier-tracking loop 32, 44, 40, and 42. In the ultratight navigation processor, the navigation calculator 66 is ultratightly coupled into the carrier control loop 32, 44, 40, 42, 62, 66 and 50. That is, code and carrier errors $\phi_e$, $\dot{\phi}_e$, $\ddot{\phi}_e$ $r_m$, and $a_m$, and the envelope state covariance $P_v$ from the tracking system 60 are routed through the integration filter 62 and navigation calculator 66 so as to ultratightly couple the navigation calculator into the carrier-tracking loop. In either navigation processor application, the adaptive m-code envelope tracking system 42 or 60 is used to generate an envelope for determining which mode of the multimodal m-code is currently aligned to the m-code code phase for tracking the m-code phase error without ambiguity.

Figure 4:
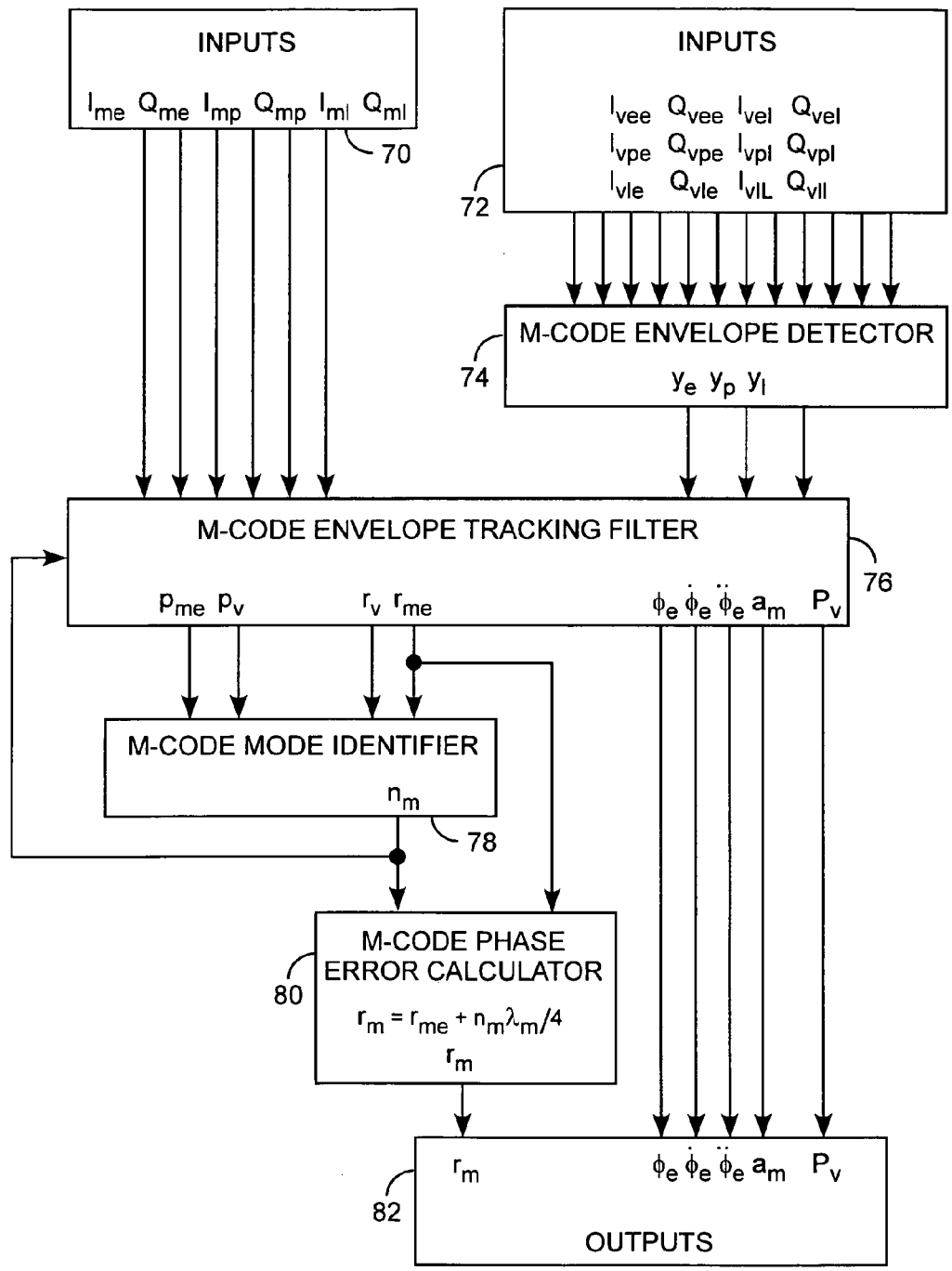
FIG. 4 is a block diagram of an adaptive m-code envelope tracking system.

Referring to FIGS. 1 through 4, and more particularly to FIG. 4, an adaptive m-code envelope tracking system 42 or 60 comprises four components, including an m-code envelope detector 74, an m-code envelope tracking filter 76, an m-code mode identifier 78, and an m-code phase error calculator 80. The I and Q samples from the correlator 40 are divided into two sets of inputs 70 and 72. A first set of quadrature component inputs 70 are used for m-code tracking by the tracking filter 76 while the second set of quadrature component inputs 72 are used for m-code envelope detection by detector 74. Inputs 70 are designated as correlations $y_m$ as m-code inphase and quadrature correlations including m-code early correlations $I_{me}$ and $Q_{me}$, m-code prompt correlations $I_{mp}$ and $Q_{mp}$, and m-code late correlations $I_{ml}$ and $Q_{ml}$. Inputs 72 are designated as correlations $y_v$, are located in code phase time relative to each other, and are processed as m-code early-late tap correlation pairs disposed on side of modal peaks. Taps for each pair are placed $\lambda_m/8$ apart, where $\lambda_m$ is the m-code chip width, and each pair is centered on a $\lambda_m/2$ early-prompt-late spacing. The m-code envelope correlations $y_v$ 72 are m-code envelope I and Q correlations including m-code envelope early-early correlations $I_{vee}$ and $Q_{vee}$, m-code envelope early-late correlations $I_{vel}$ and $Q_{vel}$, m-code envelope prompt-early correlations $I_{vpe}$ and $Q_{vpe}$, m-code envelope prompt-late correlations $I_{vpl}$ and $Q_{vpl}$, m-code envelope late-early correlations $I_{vle}$ and $Q_{vle}$, and m-code envelope late-late correlations $I_{vll}$ and $Q_{vll}$. The m-code envelope detector generates $y_e$, $y_p$, $y_l$ envelope signals characterizing the m-code envelope. The $y_e$, $y_p$, $y_l$ envelope signals are communicated to the m-code tracking filter 76. The m-code tracking filter 76 provides and computes the carrier phase error $\phi_e$ output, the carrier frequency error $\dot{\phi}_e$, the carrier frequency rate error $\ddot{\phi}_e$, the signal amplitude state $a_m$, and the envelope state covariance matrix $P_v$. The tracking filter 76 also generates an m-code error covariance $p_{me}$, an envelope covariance $p_v$, an m-code envelope range error $r_v$, and an m-code local range error $r_{me}$ that are fed to the m-code mode identifier 78. The m-code mode identifier generates a mode value $n_m$ indicating the mode that is currently aligned to the code phase $\phi_m$. The m-code error covariance $p_{me}$ and the envelope covariance $p_v$ are measures of uncertainty. The m-code local range error $r_{me}$ is a first estimate of the m-code global range error $r_m$ where $r_m = r_{me} + n_m \lambda_m/4$. The m-code global range error $r_m$ is provided as part of the output 82. The output 82 includes the signals $\phi_e$, $\dot{\phi}_e$, $\ddot{\phi}_e$, $r_m$, $a_m$, and $P_v$ generated by the tracking filter 76. The m-code local range error $r_{me}$ is a code phase distance to a modal peak. In operation, the detector 74 first detects the m-code envelope and then the m-code tracking filter 76 generates the m-code local range error $r_{me}$ from which the mode identifier 78 generates the mode value $n_m$. The m-code local range error $r_{me}$ and value $n_m$ are then used to determine the m-code global range error $r_m$. As such, the m-code envelope is used to determine which mode is currently aligned to current code phase $\phi_m$ and used to generate the m-code global range error $r_m$ from the mode value $n_m$ in the presence of multiple modes. The m-code envelope along with the mode value is used to eliminate modal tracking ambiguity by virtue of the envelope being inherently and coherently aligned to the modal correlation peaks.

Figure 5:
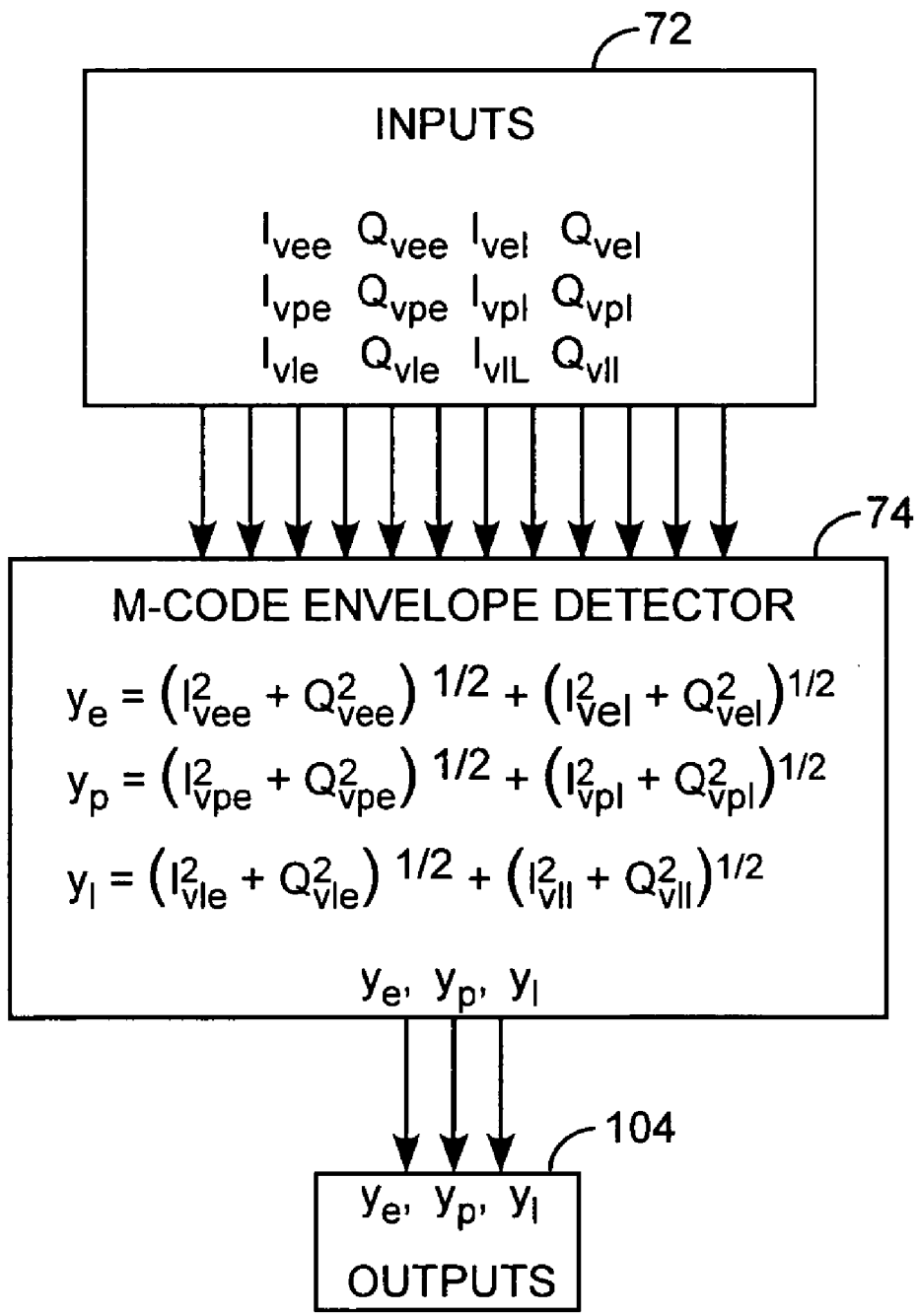
FIG. 5 is a block diagram of an m-code envelope detector.

Referring to FIGS. 1 through 5, and more particularly to FIG. 5, inputs to the m-code envelope detector 74 are from the m-code envelope correlations $y_v$ input 72. The m-code envelope detector 74 provides m-code envelope detector outputs 104 including $y_e$, $y_p$, and $y_l$ that are determined by respective envelope detector $y_e$, $y_p$, and $y_l$ equations.

Figure 6:
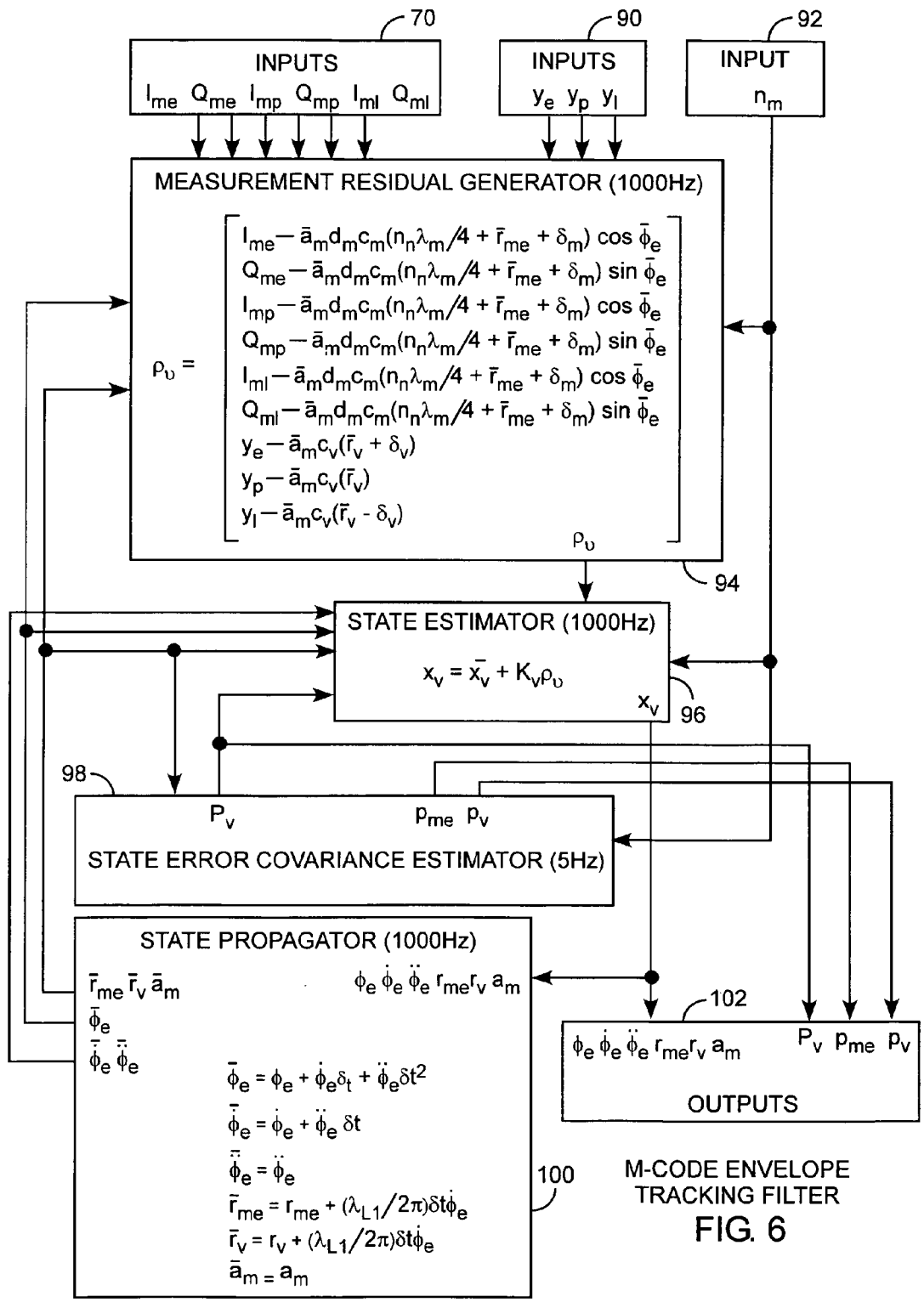
FIG. 6 is a block diagram of an m-code envelope-tracking filter.

$y_e = (I_{vee}^2 + Q_{vee}^2)^{1/2} + (I_{vel}^2 + Q_{vel}^2)^{1/2}$ $y_p = (I_{vpe}^2 + Q_{vpe}^2) + (I_{vpl}^2 + Q_{vpl}^2)^{1/2}$ $y_l = (I_{vle}^2 + Q_{vle}^2)^{1/2} + (I_{vll}^2 + Q_{vll}^2)^{1/2}$ Referring to FIGS. 1 through 6, and more particularly to FIG. 6, the m-code envelope tracking filter 76 can be implemented as an extended Kalman filter. The m-code envelope tracking filter 76 receives the $y_m$ m-code correlations 90 including $y_e$, $y_p$, and $y_l$ from the envelope detector 74 and the m-code mode value $n_m$ 92 from the mode identifier 78. The m-code envelope tracking filter 76 comprises a measurement residual generator 94, a state estimator 96, a state error covariance estimator 98, and a state propagator 100 for generating the carrier phase error $\phi_e$, the carrier phase error rate $\dot{\phi}_e$, the carrier frequency error rate $\ddot{\phi}_e$, the amplitude state $a_m$, the envelope state covariance matrix $P_v$, the local covariances $p_{me}$ and $p_v$, the m-code envelope range error $r_v$, and the m-code local range error $r_{me}$. The m-code envelope range error $r_v$ and the m-code local range error $r_{me}$ are both state estimates. A measurement residual $\rho_v$ is computed at 1000 Hz by the measurement residual generator 94 from the m-code envelope detector $y_e$, $y_p$, and $y_l$ outputs 90, the m-code mode value $n_m$ 92 that is an m-code mode identifier output, and a propagated state $\bar{x}_v$ using a measurement residual equation.

$$\rho_v = \begin{bmatrix} I_{me} - \bar{a}_m d_m c_m(n_m\lambda_m/4 + \bar{r}_{me} + \delta_m)\cos\bar{\phi} \\ Q_{me} - \bar{a}_m d_m c_m(n_m\lambda_m/4 + \bar{r}_{me} + \delta_m)\sin\bar{\phi} \\ I_{mp} - \bar{a}_m d_m c_m(n_m\lambda_m/4 + \bar{r}_{me})\cos\bar{\phi} \\ Q_{mp} - \bar{a}_m d_m c_m(n_m\lambda_m/4 + \bar{r}_{me})\sin\bar{\phi} \\ I_{ml} - \bar{a}_m d_m c_m(n_m\lambda_m/4 + \bar{r}_{me} - \delta_m)\cos\bar{\phi} \\ Q_{ml} - \bar{a}_m d_m c_m(n_m\lambda_m/4 + \bar{r}_{me} - \delta_m)\sin\bar{\phi} \\ y_e - \bar{a}_m c_v(\bar{r}_v + \delta_v) \\ y_p - \bar{a}_m c_v(\bar{r}_v) \\ y_l - \bar{a}_m c_v(\bar{r}_v - \delta_v) \end{bmatrix}$$

Each component of the measurement residual $\rho_v$ depends on the propagated state $\bar{x}_v$. The propagated state $\bar{x}_v$ has six components where $\bar{x}_v = [\bar{\phi}_e, \dot{\bar{\phi}}_e, \ddot{\bar{\phi}}_e, \bar{r}_{me}, \bar{r}_v, \bar{a}_m]$. The propagated state includes a propagated carrier phase error state $\bar{\phi}_e$ expressed in radians, propagated carrier phase error first and second order rates $\dot{\bar{\phi}}_e$ and $\ddot{\bar{\phi}}_e$, a propagated m-code local range error state $\bar{r}_{me}$ expressed in meters, a propagated m-code envelope range error state $\bar{r}_v$ also expressed in meters, and a propagated m-code amplitude state $\bar{a}_m$. Each component of the measurement residual $\rho_v$ also depends on the m-code mode value $n_m$, an early to late replicated code offset $\delta_m$, an m-code envelope early to late offset $\delta_v$, and an m-code navigation message bit $d_m$. The measurement residual generator 94 uses an m-code correlation function described by a $c_m(r)$ equation.

$$c_m(r) = \begin{cases} 1 - 7\frac{|r|}{\lambda_m}, & |r| \le \lambda_m/4 \\ 5\frac{|r|}{\lambda_m} - 2, & \lambda_m/4 < |r| \le \lambda_m/2 \\ 2 - 3\frac{|r|}{\lambda_m}, & \lambda_m/2 < |r| \le 3\lambda_m/4 \\ \frac{|r|}{\lambda_m} - 1, & 3\lambda_m/4 < |r| \le \lambda_m - 1 \\ \frac{-1.0}{\lambda_m}, & \lambda_m - 1 < |r| \end{cases}$$

The m-code correlation function depends on the pseudo-random noise (PRN) m-code chip width $\lambda_m$ and a signal structure with a square wave of period $\lambda_m/2$ superimposed on each chip. The square wave creates piecewise linear regions defined by the m-code local range error. The m-code chip width is defined by a nominal m-code chipping rate $f_m = 5.115 \times 10^6$ chips per second. The speed of light used for GPS applications is $c = 2.99792458 \times 10^8$ meters per second so the nominal m-code chip width is $\lambda_m = (c/f_m) \approx 58.61$ m. The m-code chipping rate apparent to the receiver differs slightly from $f_m$ due to user to satellite relative motion and atmospheric transmission effects.

The m-code early to late replication offset $\delta_m$ is taken to be one-eighth chip from the prompt so that in perfect code lock, the early and late code replicas are each halfway from the center correlation peak and the first negative-correlation troughs, that is, $\delta_m = (\lambda_m/8) \approx 58.61$ m. The m-code navigation message bit $d_m = \pm 1$ may have a nominal 5.0 millisecond or 20.0 millisecond period and is determined by a conventional arctangent bit detection algorithm.

An ideal m-code envelope correlation function is smooth and monotonic using a harmonic code replica. The m-code envelope detector $y_e$, $y_p$, and $y_l$ outputs 90 determine an approximate m-code envelope function $c_{vapproximate}(r) = |c_m(r+\lambda_m/16)| + |c_m(r-\lambda_m/16)|$. The approximate m-code envelope function is piecewise smooth and not monotonic but the implementation is simpler as the m-code envelope function uses conventional square-wave code replicas and the m-code envelope function provides a suitable lower bound for expected performance. A simple four-segment piecewise-linear form that is monotonic and captures the large-scale shape of the approximate m-code envelope function is the m-code envelope correlation function described by a $c_v(r)$ equation.

$$c_v(r) \approx \begin{cases} 1 - \frac{|r|}{\lambda_m}, & 0 < |r| \le \lambda_m \\ 0, & \lambda_m \le |r| \end{cases}$$

A state estimator 96 computes the state estimate $x_v$ at 1000 Hz. The output of the state estimator include $\phi_e$, $\dot{\phi}_e$, $\ddot{\phi}_e$, $r_{me}$, $r_v$, $a_m$ of output 102. The inputs to the state estimator include the measurement residual $\rho_v$, the propagated state $\bar{x}_v$, the m-code mode value $n_m$ 92, and the envelope state covariance $P_v$ using a state update equation $x_v = \bar{x}_v + K_v \rho_v$. The state update equation includes a gain $K_v$ that is computed as an extended Kalman filter gain to minimize the error variance, includes a measurement covariance $V_v$, and includes the measurement residual $\rho_v$. The Kalman filter gain $K_v$ is computed as an extended Kalman filter gain to minimize the error variance using a measurement sensitivity $h_v$. A Kalman filter gain equation $K_v = P_v h_v^T V_v^{-1}$ defines the Kalman filter gain. The measurement sensitivity $h_v$ is defined by a $h_v$ partitioned matrix.

$$h_v = \begin{bmatrix} h_{m\phi} & 0 & 0 & h_{mr} & 0 & h_{ma} \\ 0 & 0 & 0 & 0 & h_{er} & h_{ea} \end{bmatrix}$$

The measurement sensitivity $h_v$ has five measurement sensitivity partition terms including $h_{m\phi}$, $h_{mr}$, $h_{ma}$, $h_{er}$, and $h_{ea}$.

$$h_{m\phi} = \begin{bmatrix} -\bar{a}_m d_m c_m (n_m \lambda_m/4 + \bar{r}_{me} + \delta_m) \sin\bar{\phi}_e \\ \bar{a}_m d_m c_m (n_m \lambda_m/4 + \bar{r}_{me} + \delta_m) \cos\bar{\phi}_e \\ -\bar{a}_m d_m c_m (n_m \lambda_m/4 + \bar{r}_{me}) \sin\bar{\phi}_e \\ \bar{a}_m d_m c_m (n_m \lambda_m/4 + \bar{r}_{me}) \cos\bar{\phi}_e \\ -\bar{a}_m d_m c_m (n_m \lambda_m/4 + \bar{r}_{me} - \delta_m) \sin\bar{\phi}_e \\ \bar{a}_m d_m c_m (n_m \lambda_m/4 + \bar{r}_{me} - \delta_m) \cos\bar{\phi}_e \end{bmatrix}$$

$$h_{mr} = \begin{bmatrix} \bar{a}_m d_m c'_m (n_m \lambda_m/4 + \bar{r}_{me} + \delta_m) \cos\bar{\phi}_e \\ \bar{a}_m d_m c'_m (n_m \lambda_m/4 + \bar{r}_{me} + \delta_m) \sin\bar{\phi}_e \\ \bar{a}_m d_m c'_m (n_m \lambda_m/4 + \bar{r}_{me}) \cos\bar{\phi}_e \\ \bar{a}_m d_m c'_m (n_m \lambda_m/4 + \bar{r}_{me}) \sin\bar{\phi}_e \\ \bar{a}_m d_m c'_m (n_m \lambda_m/4 + \bar{r}_{me} - \delta_m) \cos\bar{\phi}_e \\ \bar{a}_m d_m c'_m (n_m \lambda_m/4 + \bar{r}_{me} - \delta_m) \sin\bar{\phi}_e \end{bmatrix}$$

$$h_{ma} = \begin{bmatrix} d_m c_m (n_m \lambda_m/4 + \bar{r}_{me} + \delta_m) \cos\bar{\phi}_e \\ d_m c_m (n_m \lambda_m/4 + \bar{r}_{me} + \delta_m) \sin\bar{\phi}_e \\ d_m c_m (n_m \lambda_m/4 + \bar{r}_{me}) \cos\bar{\phi}_e \\ d_m c_m (n_m \lambda_m/4 + \bar{r}_{me}) \sin\bar{\phi}_e \\ d_m c_m (n_m \lambda_m/4 + \bar{r}_{me} - \delta_m) \cos\bar{\phi}_e \\ d_m c_m (n_m \lambda_m/4 + \bar{r}_{me} - \delta_m) \sin\bar{\phi}_e \end{bmatrix}$$

$$h_{er} = \begin{bmatrix} \bar{a}_m c'_v (\bar{r}_v + \delta_e) \\ \bar{a}_m c'_v (\bar{r}_v) \\ \bar{a}_m c'_v (\bar{r}_v - \delta_e) \end{bmatrix}$$

$$h_{ea} = \begin{bmatrix} c_v (\bar{r}_v + \delta_e) \\ c_v (\bar{r}_v) \\ c_v (\bar{r}_v - \delta_e) \end{bmatrix}$$

The measurement sensitivity partition term $h_{mr}$ depends on an m-code correlation sensitivity function defined by a $c'_m(r)$ sensitivity equation.

$$c'_m(r) = \frac{\partial}{\partial r} c_m(r) = \begin{cases} -\frac{|r|}{r} \frac{7}{\lambda_m}, & 0 < |r| \leq \lambda_m/4 \\ \frac{|r|}{r} \frac{5}{\lambda_m}, & \lambda_m/4 < |r| \leq \lambda_m/2 \\ -\frac{|r|}{r} \frac{3}{\lambda_m}, & \lambda_m/2 < |r| \leq 3\lambda_m/4 \\ \frac{|r|}{r} \frac{1}{\lambda_m}, & 3\lambda_m/4 < |r| \leq \lambda_m - 1 \\ 0, & \lambda_m - 1 < |r| \end{cases}$$

The m-code correlation sensitivity function $c'_m(r)$ is derived from the m-code correlation function $c_m(r)$. The measurement sensitivity partition term $h_{er}$ depends on an m-code envelope correlation sensitivity function defined by a $c'_v(r)$ equation.

$$c'_v(r) \approx \begin{cases} -\frac{r}{\lambda_m |r|}, & 0 < |r| < \lambda_m \\ 0, & \lambda_m \leq |r| \end{cases}$$

The m-code envelope correlation sensitivity function $c'_v(r)$ is derived from the m-code envelope correlation function $c_v(r)$ as a simple four-segment piecewise-linear curve to capture the large-scale envelope shape.

The noise components of the $y_m$ inputs 70 and $y_v$ inputs 90 are statistically independent and hence uncorrelated so that a partitioned matrix form describes a measurement covariance $V_v$ defined by a $V_v$ measurement covariance equation.

$$V_v = \begin{bmatrix} V_m & 0 & 0 & 0 \\ 0 & V_e & 0 & 0 \\ 0 & 0 & V_e & 0 \\ 0 & 0 & 0 & V_e \end{bmatrix}$$

The measurement covariance has two measurement covariance partition terms. The first measurement covariance term is an m-code measurement covariance $V_m$.

$$V_m = \frac{\bar{a}_m^2}{\eta_m} \begin{bmatrix} 1 & 0 & 1-7\bar{\delta}_m & 0 & 1-14\bar{\delta}_m & 0 \\ 0 & 1 & 0 & 1-7\bar{\delta}_m & 0 & 1-14\bar{\delta}_m \\ 1-7\bar{\delta}_m & 0 & 1 & 0 & 1-7\bar{\delta}_m & 0 \\ 0 & 1-7\bar{\delta}_m & 0 & 1 & 0 & 1-7\bar{\delta}_m \\ 1-14\bar{\delta}_m & 0 & 1-7\bar{\delta}_m & 0 & 1 & 0 \\ 0 & 1-14\bar{\delta}_m & 0 & 1-7\bar{\delta}_m & 0 & 1 \end{bmatrix}$$

The m-code measurement covariance $V_m$ depends on a normalized m-code offset $\bar{\delta}_m = \delta_m / \lambda_m$, that is constrained by $0 < \bar{\delta}_m < 1/8$. The m-code measurement covariance $V_m$ also depends on the propagated m-code amplitude state $a_m$ that is a component of the propagated state $\bar{x}_v$, and a signal to noise power ratio $\eta_m$. The m-code measurement covariance $V_m$ is the covariance of the additive noise associated with the noise of m-code correlation $y_m$ that has a white Gaussian distribution and is correlated with respect to the early, prompt, and late signals, but is uncorrelated both in time and with respect to the inphase and quadrature signals. The m-code measurement covariance is derived directly from the m-code correlation function. The second measurement covariance term is an m-code envelope measurement covariance $V_e$ where $V_e = 2a_m^{-2}/\eta_m$. The m-code envelope measurement covariance is the covariance of the additive noise associated with the m-code envelope detector $y_e$, $y_p$, and $y_l$ outputs 90.

A state propagator 100 computes a propagated state $\bar{x}_v$ at 1000 Hz from a state estimate $x_v$. The state estimate $x_v$ has six components where $x_v = [\phi_e, \dot{\phi}_e, \ddot{\phi}_e, r_{me}, r_v, a_m]$. Again, the components of the state estimate $x_v$ include the carrier phase error state estimate $\phi_e$ expressed in radians, the carrier phase error first and second order rate state estimates $\dot{\phi}_e$ and $\ddot{\phi}_e$, the m-code local range error state estimate $r_{me}$ expressed in meters, the m-code envelope range error state estimate $r_v$ expressed in meters, and the m-code amplitude state estimate $a_m$. The m-code local range error state estimate $r_{me}$ is a replicated m-code phase error expressed in meters as indicated by the early, prompt, and late m-code correlator taps. The m-code envelope range error state estimate $r_v$ is a replicated m-code phase error expressed in meters as indicated by the early, prompt, and late m-code envelope detector $y_e$, $y_p$, and $y_l$ outputs 90.

The state propagator 100 computes the propagated state $\bar{x}_v$ using linear state propagator relations, including $\bar{\phi}_e = \phi_e + \dot{\phi}_e \delta t + \ddot{\phi}_e \delta t^2/2$, $\bar{\dot{\phi}}_e = \dot{\phi}_e + \ddot{\phi}_e \delta T$, $\bar{\ddot{\phi}}_e = \ddot{\phi}_e$, $\bar{r}_{me} = r_{me} + (\lambda_{L1}/2\pi)\dot{\phi}_e \delta t$, $\bar{r}_v = r_v + (\lambda_{L1}/2\pi)\ddot{\phi}_e \delta t$ and $\bar{a}_m = a_m$. The state propagator relations require a propagation time $\delta t = 0.001$ seconds to match the 1000 Hz calculation rate. The state propagator relations also require an L1 band carrier wavelength, $\lambda_{L1}$ to be equal to 0.1903 meters. The L1 band carrier wavelength is derived from the GPS L1 band carrier frequency with $\omega_{L1} = 1.57542 \times 10^9$ Hz, and the speed of light c used for GPS applications where $c = 2.99792458 \times 10^8$ meters per second, as $\lambda_{L1} = c/\omega_{L1} = 0.1903$ meters.

A state error covariance estimator 98 provides the envelope state covariance PV at 1000 Hz using the propagated state components $\bar{r}_{me}$, $\bar{r}_v$, and $\bar{a}_m$, and the m-code mode $n_m$. The envelope state covariance $P_v$ is a six-by-six symmetric and positive-definite matrix computed in two stages, a propagation stage and an update stage. In the propagation stage, a state covariance propagation $\bar{P}_v$ is computed using a state covariance propagation relation $\bar{P}_v = F_v P_v F_v^T + Q_v$. The state covariance propagation relation depends on a six by six state propagation matrix $F_v$.

$$F_v = \begin{bmatrix} 1 & \delta t & \delta t^2/2 & 0 & 0 & 0 \\ 0 & 1 & \delta t & 0 & 0 & 0 \\ 0 & 0 & 1 & 0 & 0 & 0 \\ 0 & \frac{\lambda_{L1}}{2\pi}\delta t & 0 & 1 & 0 & 0 \\ 0 & \frac{\lambda_{L1}}{2\pi}\delta t & 0 & 0 & 1 & 0 \\ 0 & 0 & 0 & 0 & 0 & 1 \end{bmatrix}$$

The state propagation matrix depends on a propagation time $\delta t = 0.001$ seconds and an L1 band carrier wavelength, $\lambda_{L1} = 0.1903$ meters, which are the same as those specified for the state propagator 100. The state covariance propagation relation also depends on $Q_v$ that is a six by six state process noise covariance. The state process noise covariance is determined by design iteration but may be set as the exemplary diagonal matrix $Q_v = \text{diag}[0.02, 0, 0.0003, 0, 0, 0]$. On the first application of the propagation stage, the envelope state covariance $P_v$ is a six by six matrix determined by design iteration but may be set as the exemplary diagonal matrix $P_v = \text{diag}[\pi, 10\pi, 60\pi, 30, 30, 0.2]$. In the update stage, the envelope state covariance $P_v$ is computed using an envelope state covariance update relation $P_v = (\bar{P}_v^{-1} + h_v^T V_v^{-1} h_v)^{-1}$. In the envelope state covariance update relation, the measurement sensitivity $h_v$ and the measurement covariance $V_v$ are the same as those specified for the state estimator 96. Some of the $h_v$ measurement sensitivity components, namely $h_{m\phi}$, $h_{mr}$, and $h_{ma}$, depend on the propagated carrier phase error state $\bar{\phi}_e$ through $\sin\bar{\phi}_e$ and $\cos\bar{\phi}_e$ terms. But the symmetry of the measurement covariance $V_v$ makes all the $\sin\bar{\phi}_e$ and $\cos\bar{\phi}_e$ terms combine in the product $h_v^T V_v^{-1} h_v$ as $\sin^2\bar{\phi}_e + \cos^2\bar{\phi}_e = 1$. The product $h_v^T V_v^{-1} h_v$ in the state covariance update relation does not depend on $\bar{\phi}_e$ even though the $h_v$ does depend on $\bar{\phi}_e$. Thus, the state covariance estimator 98 does not use $\bar{\phi}_e$ as an input signal.

Figure 7:
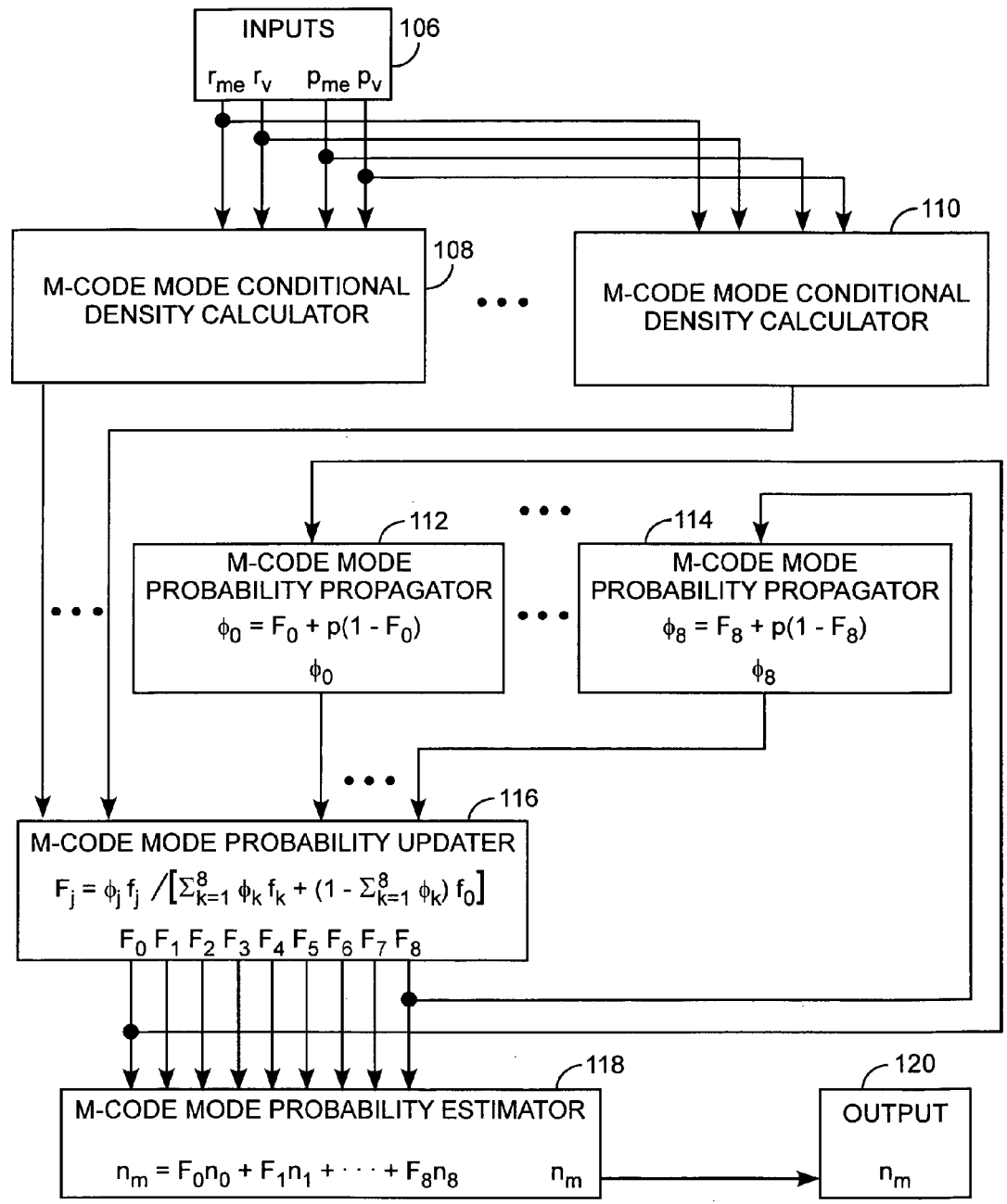
FIG. 7 is a block diagram of an m-code mode identifier.

Referring to FIGS. 1 through 7, and more particularly to FIG. 7, an m-code mode identifier 78 is an implementation of a Shiryayev sequential probability ratio test algorithm. Inputs 106 include an m-code local range error state estimate $r_{me}$ and an m-code envelope range error state estimate $r_v$, and the respective covariances $P_{me}$ and $P_v$. The m-code local range error state estimate $r_{me}$, the m-code envelope range error state estimate $r_v$, both taken from the state estimator 96 of the m-code envelope tracking filter 76. The covariances $P_{me}$ and $P_v$ that are taken from the state covariance estimator 98 of the m-code envelope tracking filter 76. The output 120 is the m-code mode value $n_m$, that is, the mode $n_m$, that is in the range $-4 < n_m < 4$ for indicating the range of modes. The integer difference between the minus four and plus four indicates seven modal peaks, one of which is indicated by the modal value $n_m$. The m-code mode $n_m$ and m-code local range error $r_{me}$ define an exhaustive and mutually exclusive set that is a partition of regions in the domain of possible range errors. When the partition is considered a set of hypotheses, then each hypothesis is computed with the probability conditioned on a sequence of m-code local range error state estimates $r_{me}$ and m-code envelope range error state estimates $r_v$.

In particular, nine hypotheses are defined such that the m-code mode $n_m$ has integer values including $H_0 = \{n_m = n_{m0} = 0\}$, $H_1 = \{n_m = n_{m1} = 1\}$, $H_2 = \{n_m = n_{m2} = -1\}$, $H_3 = \{n_m = n_{m3} = 2\}$, $H_4 = \{n_m = n_{m4} = -2\}$, $H_5 = \{n_m = n_{m5} = 3\}$, $H_6 = \{n_m = n_{m6} = -3\}$, $H_7 = (n_m = n_{m7} = 4\}$, $H_8 = \{n_m = n_{m8} = -4\}$. Also, $r_k = [r_{me}, r_v]$ are a measurement at a time designated $t_k$ with $Z_k = \{r_1, r_2, \ldots, r_k\}$ being a sequence of measurements, and with $\theta_j$ being a time at which hypothesis $H_j$ is true, at an unknown time. For each hypothesis $H_j$, a conditional probability $F_j$ is computed. The conditional probability $F_j$ is the probability that a switch to hypothesis $H_j$ occurs at or before time $t_k$ conditioned on all measurements up to time $t_k$, that is, $F_j = P(\theta_j \leq t_k | Z_k)$. The expectation is that at some time, one of the nine $F_j$ probabilities will be large enough that a confidence is established for an associated hypothesis.

The m-code mode identifier 78 has twenty components including nine instances of an m-code mode conditional density calculator as m-code mode conditional density calculators 108 and 110, nine instances of an m-code mode probability propagator as m-code mode probability propagators 112 through 114, an m-code mode probability updater 116, and an m-code mode probability estimator 118. An m-code mode conditional density calculator calculates an m-code mode conditional probability density $f_j$ associated with hypothesis $H_j$. The m-code mode conditional probability density $f_j$ is computed using a probability density function for the measurement at time $t_k$ and conditioned on hypothesis $H_j$. The m-code mode conditional probability density $f_j$ is computed as a Gaussian probability density using an m-code mode conditional density calculator of the calculators 108 through 110 and a probability density equation $f_j = \exp[(r_v - r_{me} - n_j \lambda_m/4)^2/2p_{me} + 2p_v)]/\sqrt{[2\pi(p_{me} - p_v)]}$.

Inputs to the m-code mode conditional density calculators 108 through 110 are the m-code local range error state estimate $r_{me}$ and m-code envelope range error state estimate $r_v$, and the respective covariances $p_{me}$ and $p_v$. The m-code local range error state estimate $r_{me}$ and m-code envelope range error state estimate $r_v$ are taken from the state estimator 96 of the m-code envelope-tracking filter 76. The covariances $p_{me}$ and $P_v$ are taken from the state covariance estimator 98 of the m-code envelope-tracking filter 76. Each of the m-code mode conditional density calculators 108 through 110 uses one of the nine hypothesized m-code mode integers including $n_0 = 0$, $n_1 = 1$, $n_2 = -1$, $n_3 = 2$, $n_4 = -2$, $n_5 = 3$, $n_6 = -3$, $n_7 = 4$, and $n_8 = -4$. Each of the m-code mode conditional density calculators 108 through 110 also requires an m-code chip width, $\lambda_m = 58.61$ meters. The m-code chip width is derived from the GPS m-code chipping rate, $f_m = 5115000$ chips per second, and the speed of light c used for GPS applications where $c=2.99792458\times10^8$ meters per second, as $\lambda_m=c/f_m=58.61$ meters.

Each of the m-code mode probability propagators 112 through 114 provides a propagated probability $\phi_j$ associated with one of the nine hypotheses $H_j$ as the probability that a switch to hypothesis $H_j$ occurs at or before time $t_{k+1}$ conditioned on all measurements up to time $t_k$, that is, $\phi_j=P(\theta_j\leq t_{k+1}|Z_k)$. A propagated probability $\theta_j$ is computed by the m-code mode probability propagator 112 and 114 using an m-code mode probability propagator relation $\theta_j=F_j+p(1-F_j)$. An input to each of the m-code mode probability propagators 112 through 114 is an updated probability $F_j$ that is the output of the m-code mode probability updater 116.

The m-code mode probability propagators 112 through 114 also use a switching probability p. The switching probability p explicitly allows for the possibility of a switch to hypothesis $H_j$ by defining p as the probability of a switch to hypothesis $H_j$ during any measurement interval, that is, $p=P(t_0<\theta_j<t_1)=P(\theta_j>t_0, \theta_j\leq t_1)$. Before a most likely hypothesis is identified, all switching probabilities are set to zero. Setting the switching probabilities to zero models the true hypothesis as constant with respect to all measurements. As such, the m-code mode identifier 78 becomes a Wald sequential probability ratio test. Later in the test, once a most likely hypothesis is identified, the switching probability is set to a small non-zero value as determined by design iteration or by the exemplar p=0.0001. Allowing for a hypothesis switch makes the m-code mode identifier 78 a Shiryayev sequential probability ratio test that is a special case of the Wald sequential probability ratio test.

On the first application of the m-code mode probability propagators 112 through 114, the updated probability $F_j$ is assigned as $F_j=P(\theta_j\leq t_0)=\pi_j$, that may be determined by design iteration or by the exemplar $\pi_j=1/9$. An m-code mode probability updater 116 computes the updated probability $F_j$. The updated probability is switched to hypothesis $H_j$ occurring at or before time $t_k$ and conditioned on all measurements up to time $t_k$, that is, $F_j=P(\theta_j\leq t_k|Z_k)$. The expectation is that at some time, one of the probabilities will be large enough that a confidence may be established in announcing the associated hypothesis. An updated probability $F_j$ associated with one of the nine hypotheses $H_j$ is computed by the m-code probability updater 116 using an m-code probability updater relation described in an $F_j$ probability equation.

$$F_j = \frac{\phi_j f_j}{\left[\sum_{k=1}^{8}\phi_k f_k\right]+\left(1-\sum_{k=1}^{8}\phi_k\right)f_0}$$

Inputs to the m-code probability updater 116 are the m-code mode conditional probability density $f_j$ from the r-code mode conditional density calculators 108 through 110 and the propagated probability $\phi_j$ from the n-code mode probability propagators 112 through 114. The m-code mode probability propagators 112 through 114 and the m-code mode probability updater 116 form a recursion rule function for computing the updated probabilities $F_j$ at each time $t_k$ that ensures the updated probabilities $F_j$ are consistent with the definition of a probability.

The m-code mode value $n_m$ is computed by the m-code mode probability estimator 118 using an r-code mode probability estimator relation $n_m=F_0n_0+F_1n_1+F_2n_2+F_3n_3+F_4n_4+F_5n_5+F_6n_6+F_7n_7+F_8n_8$. The nine updated probabilities $F_0$, $F_1$, $F_2$, $F_3$, $F_4$, $F_5$, $F_6$, $F_7$, and $F_8$ are inputs to the m-code mode probability estimator 118. The m-code probability updater 116 computes the nine updated probabilities $F_0$, $F_1$, $F_2$, $F_3$, $F_4$, $F_5$, $F_6$, $F_7$, and $F_8$. The form of the m-code mode probability estimator ensures that the m-code mode identifier output $n_m$ 120 is bounded by $-4\leq n_m\leq 4$.

An m-code global range error $r_m$ is computed by an m-code phase error calculator 80 using an r-code phase error relation $r_m=r_{me}+n_m\lambda_m/4$. Inputs to the r-code phase error calculator 80 are the r-code local range error state estimate $r_{me}$, taken from the m-code envelope-tracking filter 76, and the m-code mode $n_m$ taken from the m-code mode identifier 78. The r-code phase error calculator 80 also requires an r-code chip width $\lambda_m=58.61$ meters, the same n-code chip width used by the n-code mode conditional density calculators 108 through 110 of the m-code mode identifier 78.

The adaptive m-code envelope tracking system has outputs 82. The output 82 includes the carrier phase error state estimate $\phi_e$ and the rates $\dot{\phi}_e$ and $\ddot{\phi}_e$, the signal amplitude state estimate $a_m$, the m-code global range error $r_m$, and the envelope state covariance matrix $P_v$. Of the outputs 102, the carrier phase error state estimate $\phi_e$ and the rates $\dot{\phi}_e$ and $\ddot{\phi}_e$, the signal amplitude state estimate $a_m$, and the envelope state covariance $P_v$ are taken from the outputs 102 of the m-code envelope tracking filter 76.

Figure 8:
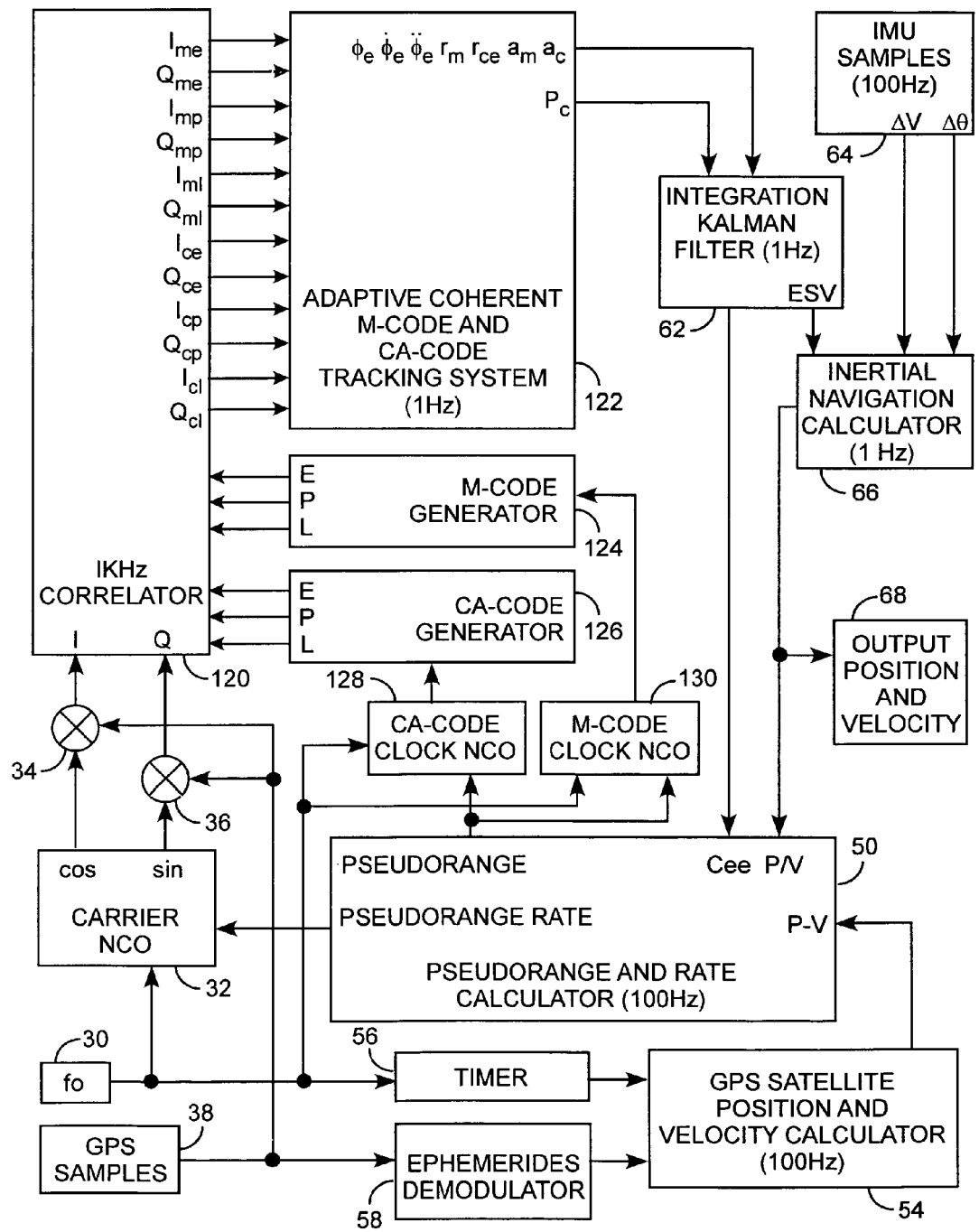
FIG. 8 is a block diagram of an ultratight coherent m-code and c/a-code navigation processor.

Referring to FIGS. 1 through 8, and more particularly to FIG. 8, the navigation system 10 may be an ultratight coherent r-code and c/a-code navigation processor. The ultratight coherent m-code and c/a-code navigation processor also receives the carrier frequency $f_o$ 30, GPS samples 38, and the IMU samples 64. The ultratight navigation processor also includes the NCO 32, mixers 34 and 36, calculators 50, 54 and 66, the timer 56, and the ephemeredes demodulator 58. The ultratight navigation processor additionally receives the IMU samples that are communicated to the 100 Hz inertial navigation calculator 66 providing position and velocity data P/V 68. The I and Q signals respectively from mixers 34 and 36 are received by a correlator 120 receiving early (E), prompt (P), and late (L) code replica signals from an m-code chipping code generator 124 receiving a chipping code clocking signal from an m-code clock NCO 130. The correlator 120 also receives early, prompt, and late code replica signals from a c/a-code chipping code generator 126 receiving a chipping code clocking signal from a c/a-code clock NCO 128. The NCOs 128 and 130 are clocked by the clock reference $f_o$ 30 and adjusted by the pseudorange from the pseudorange and rate calculator 50. The chipping m-code and the chipping c/a-code are direct sequence spread spectrum codes. The correlator 120 may operate, for example, at 1 KHz. The correlator 120 provides both inphase and quadrature, early $I_{me}$ and $Q_{me}$ m-code correlations, prompt $I_{mp}$ and $Q_{mp}$ m-code correlations, late $I_{ml}$ and $Q_{ml}$ m-code correlations, early $I_{ce}$ and $Q_{ce}$ c/a-code correlations, prompt $I_{cp}$ and $Q_{cp}$ c/a-code correlations, and late $I_{cl}$ and $Q_{cl}$ c/a-code correlations. The inphase and quadrature correlations are GPS quadrature correlation samples. The quadrature correlation sample signals are communicated, for example, at 1K Hertz, into an adaptive coherent m-code and c/a-code tracking system 122 providing, for example, a one Hertz output. The adaptive coherent m-code and c/a-code tracking system 122 can receive the quadrature correlation samples from one or more correlators 120 to accommodate dual f1 and f2 frequency integration. For dual f1 and f2 frequency integration, two respective NCOs 32, 128, and 130 and two respective code generators 124 and 126 may be used for providing an integrated error vector to the single system output 68 or to the single integration Kalman filter 62. The adaptive coherent m-code and c/a-code tracking system 122 computes the carrier phase error state estimate $\phi_e$ and the rates $\dot{\phi}_e$ and $\ddot{\phi}_e$, the m-code signal amplitude state $a_m$, the c/a-code signal amplitude state $a_c$, an m-code global range error $r_m$, a c/a-code range error $r_{ce}$, and a coherent m-code and c/a-code state covariance $P_c$ as a measurement vector output. The measure vector output is communicated to the integration filter 62. The carrier phase error $\phi_e$ and the rates $\dot{\phi}_e$ and $\ddot{\phi}_e$ may, in the context of inertial navigation, respectively correspond to a pseudorange, pseudorange rate, and pseudorange acceleration. The adaptive coherent m-code and c/a-code tracking system 122 computes the coherent state error covariance $P_c$ indicating the uncertainties in the measurement output vector of errors for a number of samples m over a major cycle epoch time. The tracking system 122 can be used in an ultratight navigation processor for GPS pseudorange computation tightly coupled with the correlation process to improve the ability to maintain tracking lock upon the received GPS signals 38.

In the exemplar ultratight coherent m-code and c/a-code navigation processor, the tracking system 122 measurement output vector of errors and the coherent state error covariance $P_c$ are communicated to the one Hertz integration Kalman filter 62 having a one-second major cycle time period between Kalman filter epochs. The 100 Hz pseudorange and pseudorange rate calculator 50 provides pseudorange rate data to the carrier NCO 32 and provides pseudorange data to the c/a-code clock NCO 128 and the m-code clock NCO 130. The m-code generator 124 is used for early, prompt, and late m-code replica signal generation. The c/a-code generator 126 is used for early, prompt, and late c/a-code replica signal generation. The correlator 120 is used to integrate and dump correlations of the I and Q carrier demodulated signals correlated with the early, prompt, and late m-code replica signals and the early, prompt, and late c/a-code replica signals.

The correlation process is based upon the early, prompt, and late replica m-code signal generation by the m-code generator 124, upon early, prompt, and late replica c/a-code signal generation by the c/a-code generator 126, and upon the replica carrier generation by the carrier NCO 32. The pseudorange and pseudorange rate data from the calculator 50 are refreshed during each cycle. During each refresh cycle, the replica carrier cosine and sine signals from the carrier NCO 32, the early, prompt, and late replica m-code signals from the m-code generator 124, and the early, prompt, and late replica c/a-code signals from the c/a-code generator 126 are adjusted under closed loop processing. The correlator 120 may operate at 1000 Hz enabling conventional correlation by providing the early, prompt, and late I and Q samples to the adaptive coherent m-code and c/a-code tracking system 122. The I and Q samples contain amplitude information that can be used with signal correlation functions to estimate the code and carrier errors. The carrier and code phase errors, that are code phase offsets of the replica signals as compared to the received GPS sample signals, can be determined as offset knowledge of the signal correlation function. The carrier and code phase offsets are used to estimate the residual errors.

Figure 9:
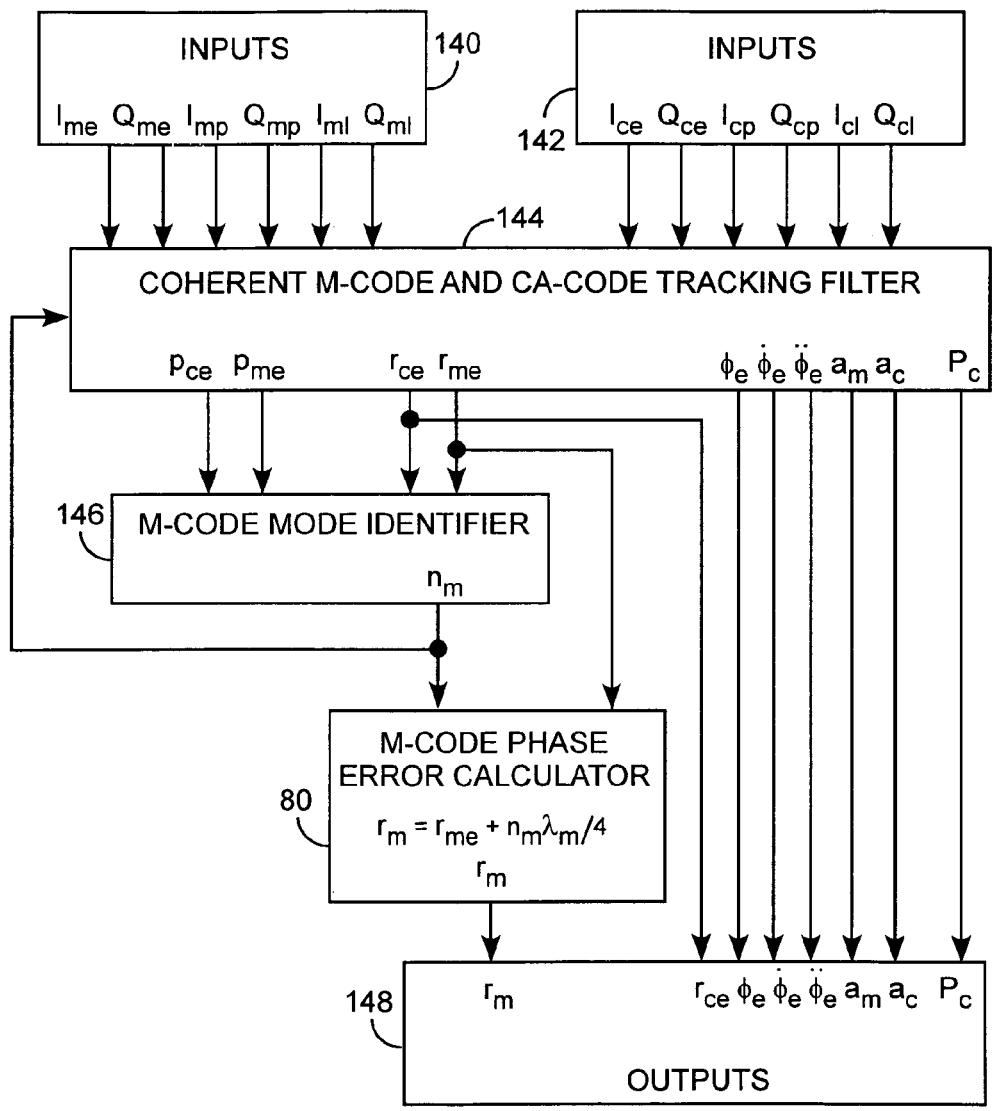
FIG. 9 is a block diagram of a coherent m-code and c/a-code tracking system.

Referring to FIGS. 1 through 9, and more particularly to FIG. 9, the adaptive coherent m-code and c/a-code tracking system 122 has three components, including a coherent m-code and c/a-code tracking filter 144, an m-code mode identifier 146, and an r-code phase error calculator 80. The inputs for the adaptive coherent r-code and c/a-code tracking system 144 are taken in two groups including an m-code correlation $y_m$ 140 and a c/a-code $y_{ca}$ correlation 142. The m-code correlation $y_m$ 140 includes the r-code early correlations $I_{me}$ and $Q_{me}$, r-code prompt correlations $I_{mp}$ and $Q_{mp}$ and m-code late correlations $I_{ml}$ and $Q_{ml}$. The c/a-code $y_{ca}$ correlation 142 includes the c/a-code early correlations $I_{ce}$ and $Q_{ce}$, c/a-code prompt correlations $I_{cp}$ and $Q_{cp}$, and c/a-code late correlations $I_{cl}$ and $Q_{cl}$. The adaptive coherent m-code and c/a-code tracking system 144 provides the carrier phase error $\phi_e$, the carrier frequency error $\dot{\phi}_e$, the carrier frequency rate error $\ddot{\phi}_e$, the m-code signal amplitude state $a_m$, the c/a-code signal amplitude state $a_c$, the m-code global range error $r_m$, the c/a-code range error $r_{ce}$, and the coherent m-code and c/a-code state covariance $P_c$ as outputs 148. In operation, the coherent m-code and c/a-code tracking filter 144 uses the autocorrelation function of the c/a-code as a coherent envelope to the multimodal correlation function of the m-code. The filter 144 first determines the c/a-code range error $r_{ce}$. The c/a-code range error $r_{ce}$ is then used by the m-code mode identifier 146 to determine the mode value $n_m$. The mode value $n_m$ and the m-code local range error $r_{me}$ is then used to determine m-code global range error $r_m$. In this manner, a coherent envelope is used to remove modal ambiguity as well as generating the sought after precise m-code global range error $r_m$ for precise coherent despreading of the m-code upon reception of the m-code signal.

Figure 10:
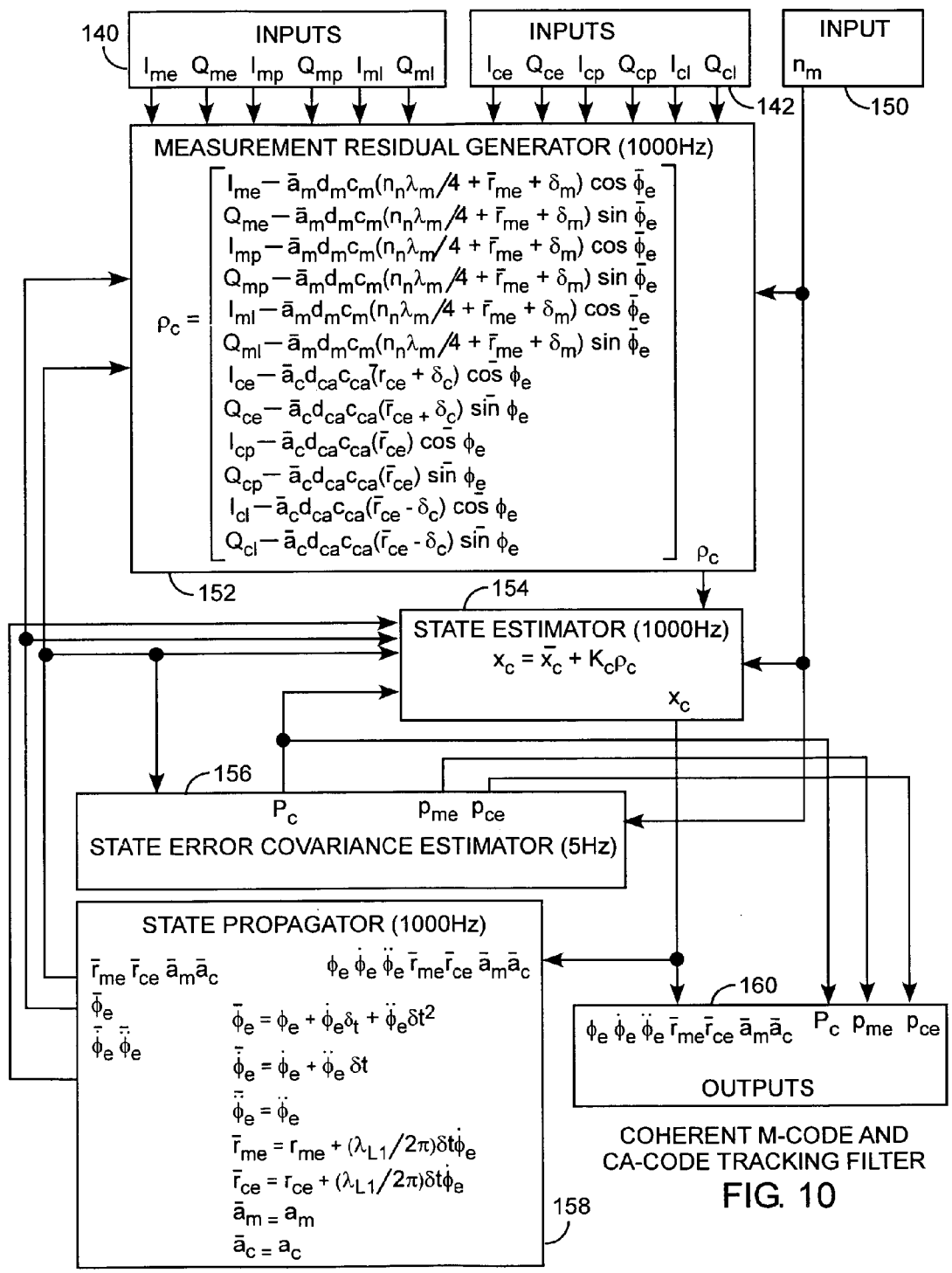
FIG. 10 is a block diagram of a coherent m-code and c/a-code tracking filter.

Referring to all of the Figures, and more particularly FIG. 10, the coherent m-code and c/a-code tracking filter 144 is again an implementation of an extended Kalman filter. Inputs to the coherent m-code and c/a-code tracking filter are the m-code $y_m$ correlation 140, the c/a-code $y_{ca}$ correlation 142, and an m-code mode value n % that is an output of the m-code mode identifier 146. The coherent m-code and c/a-code tracking filter 144 has four components including a measurement residual generator 152, a state estimator 154, a state error covariance estimator 156, and a state propagator 158. A measurement residual $\rho_c$ is computed at 1000 Hz by the measurement residual generator 152 from the m-code $y_m$ correlation 140, from the c/a-code $y_{ca}$ correlation 152, from the m-code mode $n_m$ input 150, and from a propagated state $\bar{x}_c$ using a measurement residual generator relational equation.

$$\rho_c = \begin{bmatrix} I_{me} - \bar{a}_m d_m c_m(n_m\lambda_m/4 + \bar{r}_{me} + \delta_m)\cos\bar{\phi}_e \\ Q_{me} - \bar{a}_m d_m c_m(n_m\lambda_m/4 + \bar{r}_{me} + \delta_m)\sin\bar{\phi}_e \\ I_{mp} - \bar{a}_m d_m c_m(n_m\lambda_m/4 + \bar{r}_{me})\cos\bar{\phi}_e \\ Q_{mp} - \bar{a}_m d_m c_m(n_m\lambda_m/4 + \bar{r}_{me})\sin\bar{\phi}_e \\ I_{ml} - \bar{a}_m d_m c_m(n_m\lambda_m/4 + \bar{r}_{me} - \delta_m)\cos\bar{\phi}_e \\ Q_{ml} - \bar{a}_m d_m c_m(n_m\lambda_m/4 + \bar{r}_{me} - \delta_m)\sin\bar{\phi}_e \\ I_{ce} - \bar{a}_{ca} d_{ca} c_{ca}(\bar{r}_{ce} + \delta_{ca})\cos\bar{\phi}_e \\ Q_{ce} - \bar{a}_{ca} d_{ca} c_{ca}(\bar{r}_{ce} + \delta_{ca})\sin\bar{\phi}_e \\ I_{cp} - \bar{a}_{ca} d_{ca} c_{ca}(\bar{r}_{ce})\cos\bar{\phi}_e \\ Q_{cp} - \bar{a}_{ca} d_{ca} c_{ca}(\bar{r}_{ce})\sin\bar{\phi}_e \\ I_{cl} - \bar{a}_{ca} d_{ca} c_{ca}(\bar{r}_{ce} - \delta_{ca})\cos\bar{\phi}_e \\ Q_{cl} - \bar{a}_{ca} d_{ca} c_{ca}(\bar{r}_{ce} - \delta_{ca})\sin\bar{\phi}_e \end{bmatrix}$$

Each component of the measurement residual $\rho_c$ depends on the propagated state $\bar{x}_c$. The propagated state $\bar{x}_c$ has seven components where $\bar{x}_c = [\bar{\phi}_e, \dot{\bar{\phi}}_e, \ddot{\bar{\phi}}_e, \bar{r}_{me}, \bar{r}_{ce}, \bar{a}_m, \bar{a}_{ca}]$. The propagated state $\bar{x}_c$ includes the propagated carrier phase error state $\bar{\phi}_e$ expressed in radians, propagated carrier phase error first and second order rate states $\dot{\bar{\phi}}_e$ and $\ddot{\bar{\phi}}_e$, the propagated m-code local range error state $\bar{r}_{me}$ expressed in meters, a propagated c/a-code range error state $\bar{r}_{ce}$ also expressed in meters, the propagated m-code amplitude state $\bar{a}_m$, and a propagated c/a-code amplitude state $\bar{a}_{ca}$. Each component of the measurement residual $\rho_c$ also depends on the m-code $n_m$ mode value 150, an early to late replicated m-code offset $\delta_m$, an early to late replicated c/a-code offset $\delta_{ca}$, an m-code navigation message bit $d_m$, and a c/a-code navigation message bit $d_{ca}$.

The measurement residual generator 152 uses the c/a-code autocorrelation function $c_{ca}(r)=\max(1-|r|/\lambda_{ca}, -1/\lambda_{ca})$. The c/a-code correlation function depends on the pseudorandom noise c/a-code chip width $\lambda_{ca}$. The c/a-code chip width $\lambda_{ca}$ is defined by a nominal c/a-code chipping rate $f_{ca}=1023000$ chips per second. The speed of light used for GPS applications is $c=2.99792458\times10^8$ meters per second so the nominal c/a-code chip width is $\lambda_{ca}=(c/f_{ca})=293.05$ meters. The c/a-code chipping rate apparent to the receiver differs slightly from $f_{ca}$ due to user to satellite relative Doppler motion and atmospheric transmission effects. The c/a-code early to late replication offset $\delta_{ca}$ is taken to be one-half chip from the prompt replica so that in perfect code lock, the early and late code replicas are each halfway from the center correlation peak and zero correlation, that is, $\delta_{ca}=\lambda_{ca}/2\approx146.53$ meters. The c/a-code navigation message bit $d_{ca}=\pm1$ has a nominal 20.0 millisecond period and is determined by a conventional arctangent bit detection algorithm. The c/a-code navigation message bit $d_{ca}$ may be a different stream than that modulated on the m-code signal.

A state estimate $x_c$ is computed at 1000 Hz by a state estimator 154 from the measurement residual $\rho_c$, the propagated state $\bar{x}_c$, the m-code mode $n_m$ 150, and the coherent state error covariance $P_c$ using a state estimator relation $x_c = \bar{x}_c + K_c\rho_c$. The state estimator 154 uses a gain $K_c$ computed as an extended Kalman filter gain to minimize the error variance. The gain $K_c$ is computed using a measurement sensitivity $h_c$, a measurement covariance $V_c$, and a Kalman filter gain equation $K_c = P_c h_c^T V_c^{-1}$. The measurement sensitivity $h_c$ is a partitioned matrix.

$$h_c = \begin{bmatrix} h_{m\phi} & 0 & 0 & h_{mr} & 0 & h_{ma} & 0 \\ h_{c\phi} & 0 & 0 & 0 & h_{cr} & 0 & h_{ca} \end{bmatrix}$$

The measurement sensitivity $h_c$ has six partition terms including $h_{m\phi}$, $h_{mr}$, $h_{ma}$, $h_{c\phi}$, $h_{cr}$, and $h_{ca}$. The terms $h_{m\phi}$, $h_{mr}$, and $h_{ma}$ have the same form as terms $h_{c\phi}$, $h_{cr}$, and $h_{ca}$ that are defined by respective $h_{c\phi}$, $h_{cr}$, and $h_{ca}$ matrices.

$$h_{c\phi} = \begin{bmatrix} -\bar{a}_{ca}d_{ca}c_{ca}(\bar{r}_{ce}+\delta_{ca})\sin\bar{\phi}_e \\ \bar{a}_{ca}d_{ca}c_{ca}(\bar{r}_{ce}+\delta_{ca})\cos\bar{\phi}_e \\ -\bar{a}_{ca}d_{ca}c_{ca}(\bar{r}_{ce})\sin\bar{\phi}_e \\ \bar{a}_{ca}d_{ca}c_{ca}(\bar{r}_{ce})\cos\bar{\phi}_e \\ -\bar{a}_{ca}d_{ca}c_{ca}(\bar{r}_{ce}+\delta_{ca})\sin\bar{\phi}_e \\ \bar{a}_{ca}d_{ca}c_{ca}(\bar{r}_{ce}-\delta_{ca})\cos\bar{\phi}_e \end{bmatrix}$$

$$h_{cr} = \begin{bmatrix} \bar{a}_{ca}d_{ca}c'_{ca}(\bar{r}_{ce}+\delta_{ca})\cos\bar{\phi}_e \\ \bar{a}_{ca}d_{ca}c'_{ca}(\bar{r}_{ce}+\delta_{ca})\sin\bar{\phi}_e \\ \bar{a}_{ca}d_{ca}c'_{ca}(\bar{r}_{ce})\cos\bar{\phi}_e \\ \bar{a}_{ca}d_{ca}c'_{ca}(\bar{r}_{ce})\sin\bar{\phi}_e \\ \bar{a}_{ca}d_{ca}c'_{ca}(\bar{r}_{ce}-\delta_{ca})\cos\bar{\phi}_e \\ \bar{a}_{ca}d_{ca}c'_{ca}(\bar{r}_{ce}-\delta_{ca})\sin\bar{\phi}_e \end{bmatrix}$$

$$h_{ca} = \begin{bmatrix} d_{ca}c_{ca}(\bar{r}_{ce}+\delta_{ca})\cos\bar{\phi}_e \\ d_{ca}c_{ca}(\bar{r}_{ce}+\delta_{ca})\sin\bar{\phi}_e \\ d_{ca}c_{ca}(\bar{r}_{ce})\cos\bar{\phi}_e \\ d_{ca}c_{ca}(\bar{r}_{ce})\sin\bar{\phi}_e \\ d_{ca}c_{ca}(\bar{r}_{ce}-\delta_{ca})\cos\bar{\phi}_e \\ d_{ca}c_{ca}(\bar{r}_{ce}-\delta_{ca})\sin\bar{\phi}_e \end{bmatrix}$$

The measurement sensitivity $h_c$ uses a c/a-code correlation function that is a four segment piecewise linear curve described by a $c_{ca}(r)$ equation.

$$c_{ca}(r) = \begin{cases} -\dfrac{|r|}{\lambda_{ca}}, & 0 < |r| < (\lambda_{ca}+1) \\ 0, & \lambda_{ca}+1 \leq |r| \end{cases}$$

The measurement sensitivity partition term $h_{cr}$ depends on a c/a-code correlation sensitivity function derived from the c/a-code correlation function $c_{ca}(r)$ and defined by a $c'_{ca}(r)$ equation.

$$c'_{ca}(r) = \frac{\partial}{\partial r}c_{ca}(r) = \begin{cases} -\dfrac{|r|}{r}\dfrac{1}{\lambda_{ca}}, & 0 < |r| < (\lambda_{ca}+1) \\ 0, & \lambda_{ca}+1 \leq |r| \end{cases}$$

The noise components are statistically independent and therefore uncorrelated so that the measurement covariance $V_c$ is a partitioned matrix.

$$V_c = \begin{bmatrix} V_m & 0 \\ 0 & V_{ca} \end{bmatrix}$$

The measurement covariance has two measurement covariance partition terms. The first measurement covariance term is the m-code measurement covariance $V_m$. The second measurement covariance term is a c/a-code measurement covariance $V_{ca}$ defined by a $V_{ca}$ matrix.

$$V_{ca} = \frac{\bar{a}_{ca}^2}{\eta_{ca}}\begin{bmatrix} 1 & 0 & 1-\bar{\delta}_{ca} & 0 & 1-2\bar{\delta}_{ca} & 0 \\ 0 & 1 & 0 & 1-\bar{\delta}_{ca} & 0 & 1-2\bar{\delta}_{ca} \\ 1-\bar{\delta}_{ca} & 0 & 1 & 0 & 1-\bar{\delta}_{ca} & 0 \\ 0 & 1-\bar{\delta}_{ca} & 0 & 1 & 0 & 1-\bar{\delta}_{ca} \\ 1-2\bar{\delta}_{ca} & 0 & 1-\bar{\delta}_{ca} & 0 & 1 & 0 \\ 0 & 1-2\bar{\delta}_{ca} & 0 & 1-\bar{\delta}_{ca} & 0 & 1 \end{bmatrix}$$

The c/a-code measurement covariance $V_{ca}$ depends on a normalized c/a-code offset $\bar{\delta}_{ca}=\delta_{ca}/\delta_{ca}$, which is constrained as $0 \leq \bar{\delta}_{ca} \leq 1/2$. The c/a-code measurement covariance $V_{ca}$ also depends on the propagated c/a-code amplitude state $\bar{a}_{ca}$ that is a component of the propagated state $\bar{x}_c$, and a c/a-code signal to noise power ratio $\eta_{ca}$. The c/a-code measurement covariance $V_{ca}$ is the covariance of the additive noise associated with the c/a-code correlation $y_{ca}=[I_{ce}, Q_{ce}, I_{cp}, Q_{cp}, I_{cl}, Q_{cl}]$ 142. The additive noise has a white Gaussian distribution and is correlated with respect to the early, prompt, and late signals, but is uncorrelated both in time and with respect to the I and Q signals. The c/a-code measurement covariance $V_{ca}$ is derived directly from the c/a-code correlation function.

A state propagator 158 computes a propagated state $\bar{x}_c$ at 1000 Hz from the state estimate $x_c$ from the state estimator 154. The propagated state $\bar{x}_c$ is a state vector $[\bar{\phi}_e, \dot{\bar{\phi}}_e, \ddot{\bar{\phi}}_e, \bar{r}_{me}, \bar{r}_{ce}, \bar{a}_m, \bar{a}_{ca}]$. The state estimate $x_c$ has seven components including $[\phi_e, \dot{\phi}_e, \ddot{\phi}_e, r_{me}, r_{ce}, a_m, a_{ca}]$. The state estimate $x_c$ includes a replicated carrier phase error state estimate $\phi_e$ expressed in radians, first and second rates $\dot{\phi}_e$ and $\ddot{\phi}_e$, an m-code local range error state estimate $r_{me}$, a c/a-code range error state estimate $r_{ce}$, an m-code signal amplitude state estimate $a_m$, and a c/a-code signal amplitude state estimate $a_{ca}$. The m-code local range error state estimate $r_{me}$ is a replicated m-code phase error expressed in meters as indicated by the early, prompt, and late m-code correlator taps. The c/a-code range error state estimate $r_{ce}$, is a replicated c/a-code phase error expressed in meters as indicated by the early, prompt, and late c/a-code correlator taps.

The state propagator 158 computes the propagated state $\bar{x}_c$ using linear state propagator relations. The linear state propagator relations include $\bar{\phi}_e = \phi_e + \dot{\phi}_e \delta t + \ddot{\phi}_e \delta t^2/2$, $\dot{\bar{\phi}}_e = \dot{\phi}_e + \ddot{\phi}_e \delta t$, $\ddot{\bar{\phi}} = \ddot{\phi}_e$, $\bar{r}_{me} = r_{me} + (\lambda_{L1}/2\pi)\dot{\phi}_e \delta t$, $\bar{r}_{ce} = r_{ce} + (\lambda_{L1}/2\pi)\dot{\phi}_e \delta t$, $\bar{a}_m = a_m$, and $\bar{a}_{ca} = a_{ca}$. The linear state propagator relations require a propagation time $\delta t = 0.001$ seconds to match the 1000 Hz calculation rate of the state propagator. The linear state propagator relations also require an L1 band carrier wavelength, $\lambda_{L1} = 0.1903$ meters. The L1 band carrier wavelength is derived from the GPS L1 band carrier frequency, $\omega_{L1} = 1.57542 \times 10^9$ Hz, and the speed of light c used for GPS applications, $c = 2.99792458 \times 10^8$ meters per second, as $\lambda_{L1} = c/\omega_{L1} = 0.1903$ meters.

A state error covariance estimator 156 provides a state error covariance estimate $P_c$ at 1000 Hz using the propagated state components $\bar{r}_{ce}$, $\bar{r}_{ce}$, $\bar{a}_m$, and $\bar{a}_{ca}$, and the r-code mode value $n_m$. The state error covariance estimate $P_c$ is a seven by seven symmetric and positive-definite matrix computed in two stages, a propagation stage and an update stage. In the propagation stage, the state error covariance estimate $\bar{P}_c$ is computed using a state error covariance propagation relation $\bar{P}_c = F_c P_c F_c^T + Q_c$. The state error covariance propagation relation depends on a seven by seven state transition matrix $F_c$.

$$F_c = \begin{bmatrix} 1 & \delta_t & \delta_t^2/2 & 0 & 0 & 0 & 0 \\ 0 & 1 & \delta_t & 0 & 0 & 0 & 0 \\ 0 & 0 & 1 & 0 & 0 & 0 & 0 \\ 0 & \frac{\lambda_{L1}}{2\pi}\delta_t & 0 & 1 & 0 & 0 & 0 \\ 0 & \frac{\lambda_{L1}}{2\pi}\delta_t & 0 & 0 & 1 & 0 & 0 \\ 0 & 0 & 0 & 0 & 0 & 1 & 0 \\ 0 & 0 & 0 & 0 & 0 & 0 & 1 \end{bmatrix}$$

The state transition matrix $F_c$ depends on a propagation time $\delta t = 0.001$ seconds and an L1 band carrier wavelength, $\lambda_{L1} = 0.1903$ meters, which are the same as those specified for the state propagator 100. The state error covariance propagation relation also depends on a seven-by-seven state process noise covariance $Q_c$. The state process noise covariance $Q_c$ is determined by design iteration but may be set as the exemplary diagonal matrix $Q_c = \text{diag}[0.02, 0, 0.0003, 0, 0, 0, 0]$. In the update stage, the state error covariance estimate $P_c$ is computed using a state error covariance update relation $P_c = (\bar{P}_c^{-1} + h_c^T V_c^{-1} h_c)^{-1}$. In the state error covariance update relation, the measurement sensitivity $h_c$ and the measurement covariance $V_c$ are the same as those specified for the state estimator 96. The $h_c$ measurement sensitivity components, namely $h_{m\phi}$, $h_{mr}$, $h_{ma}$, $h_{c\phi}$, $h_{cr}$, and $h_{ca}$ depend on the propagated carrier phase error state $\bar{\phi}_e$ through $\sin \bar{\phi}_e$ and $\cos \bar{\phi}_e$ terms. However, the symmetry of the measurement covariance $V_c$ makes all the $\sin \bar{\phi}_e$ and $\cos \bar{\phi}_e$ terms combine in the product $h_c^T V_c^{-1} h_c$ as $\sin^2 \bar{\phi}_e + \cos^2 \bar{\phi}_e = 1$. The product $h_c^T V_c^{-1} h_c$ in the state error covariance update relation does not depend on $\bar{\phi}_e$ even though the $h_c$ does depend on $\bar{\phi}_e$. Thus, the state error covariance estimator 156 does not indicate as an input. On a first calculation, $P_c$ is a seven by seven matrix determined by design iteration but may be set as the exemplary diagonal matrix $P_v = \text{diag}[\pi, 10\pi, 60\pi, 30, 30, 0.2, 0.2]$.

The m-code mode identifier 146 is the same as that for the adaptive m-code envelope tracking system 42 and 60 except that the m-code envelope range error $r_v$ and the covariance PV are respectively replaced by the c/a-code range error $r_{ce}$, and the c/a-code range error covariance $p_{ce}$. The c/a-code range error $r_{ce}$ and the c/a-code range error covariance $p_{ce}$ are outputs of the m-code and c/a-code tracking filter 144. The m-code range error $r_m$ is the same for both of the calculators 80 in respective tracking systems 60 and 122. The adaptive coherent m-code and c/a-code tracking system 122 has outputs 148. The outputs 148 include components of the state estimate $x_c$. The coherent m-code and c/a-code tracking filter 144 provides components of the outputs 148 including the carrier phase error estimate $\phi_e$, the carrier phase error rate estimates $\dot{\phi}_e$ and $\ddot{\phi}_e$, the m-code signal amplitude state estimate $a_m$, the c/a-code signal amplitude state estimate $a_{ca}$, and the m-code and c/a-code coherent envelope state covariance $P_c$. The outputs 148 also include the m-code global range error $r_m$ that is taken from the m-code phase error calculator 80. The sought after m-code global range error $r_m$ indirectly adjusts the NCOs 128 and 130 for unambiguous and accurate coherent despreading of the m-code and c/a-code GPS spread spectrum signals.

The invention is directed to an m-code tracking system for preferred use in a navigation processor of a navigation system that may be a weak-lock, ultratight, or coherent navigation system. The invention determines a coherent envelope and the current mode aligned to a current code phase of a multimodal signal for precisely determining multimodal code phase errors. The coherent envelope is preferably an envelope of the multimodal correction function, but can also be a coherent envelope of a coherently received signal. The coherent envelope can be, for example, the autocorrelation function of a coherently received c/a-code signal. The system unambiguously and precisely determines the code phase error of a multimodal spread spectrum signal having a multimodal spread spectrum chipping code having a multimodal autocorrelation function. By detecting a coherent envelope and unambiguously determining the mode, precise multimodal code phase errors can be determined for improved tracking of the multimodal spread spectrum signal. Those skilled in the art can make enhancements, improvements, and modifications to the invention, and these enhancements, improvements, and modifications may nonetheless fall within the spirit and scope of the following claims.

What is claimed is:
1. A system for determining a code phase error of a multimodal spread spectrum signal spread by a multimodal code being a spread spectrum chipping code having a multimodal autocorrelation function having modal peaks, the system being a coherent system for further coherently receiving an arbitrary code spread spectrum signal with the multimodal spread spectrum signal, the arbitrary code spread spectrum signal having an arbitrary autocorrelation function the system comprising, a demodulator for carrier demodulating the multimodal spread spectrum signal into multimodal quadrature signals and for carrier demodulating the arbitrary code spread spectrum signal into arbitrary quadrature signals, a generator for generating multimodal code replicas of the multimodal code, the multimodal code replicas being offset in time to the multimodal code by the code phase error, an arbitrary code generator for generating arbitrary code replicas of the arbitrary code, the arbitrary code replicas being offset in time to the multimodal code by the code phase error;

a correlator for receiving multimodal quadrature signals and correlating the multimodal quadrature signals into multimodal quadrature correlations using the multimodal code replicas, the correlator further for receiving the arbitrary quadrature signals and correlating the arbitrary code quadrature signals into arbitrary code quadrature correlations using the arbitrary code replicas, and a tracking system for receiving the multimodal quadrature correlations and the arbitrary code quadrature correlations and for detecting an arbitrary envelope of the arbitrary autocorrelation function coherently encompassing the modal peaks for the multimodal code and for identifying a mode of the modal peaks for generating the code phase error.

2. The system of claim 1 wherein, the envelope is a unimodal c/a-code envelope, and the multimodal code is an m-code code.

3. A system for determining the code phase error of an m-code spread spectrum signal spread by a m-code code being a spread spectrum chipping code having an m-code autocorrelation function having modal peaks, wherein the system is a coherent system for further coherently receiving an arbitrary code spread spectrum signal with the m-code spread spectrum signal, the arbitrary code spread spectrum signal having an arbitrary autocorrelation function, the system comprising, a demodulator for carrier demodulating the m-code spread spectrum signal into m-code quadrature signals and for carrier demodulating the arbitrary code spread spectrum signal into arbitrary quadrature signals, an m-code code generator for generating m-code code replicas of the m-code code, the m-code code replicas being offset in time to the multimodal code by the code phase error, an arbitrary code generator for generating arbitrary code replicas of the arbitrary code, the arbitrary code replicas being offset in time to the m-code by the code phase error, a correlator for receiving the m-code quadrature signals and correlating the m-code quadrature signals into m-code quadrature correlations using the m-code code replicas, the correlator further for receiving the arbitrary quadrature signals and correlating the arbitrary code quadrature signals into arbitrary code quadrature correlations using the arbitrary code replicas and a tracking system for receiving the m-code quadrature correlations and the arbitrary code quadrature correlation and for detecting an arbitrary envelope of the arbitrary autocorrelation function coherently encompassing the modal peaks for the m-code and for identifying a mode $n_m$ of the modal peaks for generating the code phase error $r_m$.

4. The system of claim 3 wherein, the arbitrary spread spectrum signal is a c/a-code spread spectrum signal, the arbitrary quadrature signals are c/a-code quadrature signals, the arbitrary autocorrelation function is a c/a-code autocorrelation function, the arbitrary quadrature correlations are c/a-code quadrature correlations, and the arbitrary code replicas are c/a-code replicas.

5. The system of claim 3 wherein the system is a coherent ultratight system, the system further comprising, an integration filter for receiving the code phase error and for generating an error state vector, an inertial navigation calculator for receiving the error state vector and generating position and velocity data, and a pseudorange and rate calculator for receiving the position and velocity data for adjusting the carrier phase and m-code replicas and arbitrary code replicas for coherent demodulation by the demodulator and coherent correlation by the correlator.

6. The system of claim 3 wherein, the arbitrary spread spectrum signal is a c/a-code spread spectrum signal, the arbitrary quadrature signals are c/a-code quadrature signals, the arbitrary autocorrelation function is a c/a-code autocorrelation function, the arbitrary quadrature correlations are c/a-code quadrature correlations, the arbitrary code replicas are c/a-code replicas, the system is a coherent ultratight system, and the system further comprises, an integration filter for receiving the code phase error and for generating an error state vector, an inertial navigation calculator for receiving the error state vector and generating position and velocity data, and a pseudorange and rate calculator for receiving the position and velocity data for adjusting the carrier phase and m-code replicas and arbitrary code replicas for coherent demodulation by the demodulator and coherent correlation by the correlator.

* * * * *